US011266909B2

(12) United States Patent
Shigeta et al.

(10) Patent No.: US 11,266,909 B2
(45) Date of Patent: Mar. 8, 2022

(54) STORAGE MEDIUM STORING GAME PROGRAM, INFORMATION PROCESSING APPARATUS, GAME PROCESSING METHOD, AND GAME SYSTEM

(71) Applicant: NINTENDO CO., LTD., Kyoto (JP)

(72) Inventors: Waki Shigeta, Kyoto (JP); Syunsuke Watanabe, Kyoto (JP); Kouhei Maeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/674,284

(22) Filed: Nov. 5, 2019

(65) Prior Publication Data
US 2020/0139247 A1 May 7, 2020

(30) Foreign Application Priority Data
Nov. 6, 2018 (JP) .............................. JP2018-208817

(51) Int. Cl.
*A63F 9/24* (2006.01)
*A63F 13/00* (2014.01)
*G06F 17/00* (2019.01)
*A63F 13/55* (2014.01)
*A63F 13/795* (2014.01)
*A63F 13/822* (2014.01)

(52) U.S. Cl.
CPC ............ *A63F 13/55* (2014.09); *A63F 13/795* (2014.09); *A63F 13/822* (2014.09)

(58) Field of Classification Search
CPC .................................................... A63F 13/847
See application file for complete search history.

(56) References Cited

FOREIGN PATENT DOCUMENTS

JP 2015-195841 11/2015

OTHER PUBLICATIONS

Age of Empires II: The Age of the Kings manual, Microsoft Corporation, 1999, Retrieved Dec. 22, 2020 from ReplacementDocs.com <http://www.replacementdocs.com/download.php?view.275> (Year: 1999).*

* cited by examiner

*Primary Examiner* — Milap Shah
*Assistant Examiner* — Jason Pinheiro
(74) *Attorney, Agent, or Firm* — Nixon & Vanderhye PC

(57) ABSTRACT

An offensive object and a defensive object are disposed in a field according to a first user's operation, and a display device is caused to display a portion of the field including the disposed offensive and defensive objects. A second user's defensive object disposed according to the second user's operation, and the offensive object disposed by the first user, are disposed in a field, and a battle process between the first user's offensive object and the second user's defensive object is performed according to the first user's operation.

14 Claims, 13 Drawing Sheets

FIG. 9

| INCREASE/DECREASE IN RATE ON OFFENSE ||
|---|---|
| RESULT | INCREASE/DECREASE IN RATE |
| WIN WITH FOUR OBJECTS REMAINING | +80 |
| WIN WITH THREE OBJECTS REMAINING | +60 |
| WIN WITH TWO OBJECTS REMAINING | +40 |
| WIN WITH ONE OBJECT REMAINING | +20 |
| LOSS (NO OBJECTS REMAINING/ONE OR MORE OBJECTS ON DEFENSE REMAINING) | ±0 |

FIG. 10

| INCREASE/DECREASE IN RATE ON DEFENSE ||
|---|---|
| RESULT | INCREASE/DECREASE IN RATE |
| LOSS WITH FOUR OPPONENT OBJECTS REMAINING | −80 |
| LOSS WITH THREE OPPONENT OBJECTS REMAINING | −60 |
| LOSS WITH TWO OPPONENT OBJECTS REMAINING | −40 |
| LOSS WITH ONE OPPONENT OBJECT REMAINING | −20 |
| WIN (NO OPPONENT OBJECTS REMAINING/ONE OR MORE OBJECTS ON DEFENSE REMAINING) | ±0 |

STORAGE MEDIUM STORING GAME PROGRAM, INFORMATION PROCESSING APPARATUS, GAME PROCESSING METHOD, AND GAME SYSTEM

CROSS REFERENCE TO RELATED APPLICATIONS

The disclosure of Japanese Patent Application No. 2018-208817, filed Nov. 6, 2018, is incorporated herein by reference.

FIELD

The technology disclosed herein relates to storage mediums storing a game program, information processing apparatuses, game processing methods, and game systems. More particularly, the technology disclosed herein relates to, for example, a storage medium storing a game program, information processing apparatus, game processing method, and game system for performing a battle process between objects of players.

BACKGROUND AND SUMMARY

In the background art, there is a game program that performs a game process of disposing an object in a player's territory before a battle in order to defend the territory against another player's attack. A player can choose a battle opponent from other players participating in a game, and attack the opposing player's territory, and can deploy soldiers, etc., possessed by the player in the battle opponent's territory displayed in an attack scene of the battle, and attack the battle opponent.

However, in a game performed by executing such a game program, an object is disposed in a player's territory only in terms of defense, i.e. only in terms of how to hold the territory from another player's attack. Therefore, such a game may have a poor strategic aspect, and may be monotonous.

With this in mind, it is an object of this non-limiting example to provide a storage medium storing a game program, information processing apparatus, game processing method, and game system in which a game can be prevented from being monotonous in a battle process between objects of users.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

A non-limiting example of a non-transitory computer-readable storage medium storing a game program of this non-limiting example is executed by a computer of a first information processing apparatus operated by a first user. The game program causes the computer of the first information processing apparatus to execute: disposing a first offensive object of the first user in a field according to the first user's operation; disposing a defensive object of the first user in the field according to the first user's operation; causing a display device to display at least a portion of the field including the disposed first offensive object and defensive object of the first user; and disposing a defensive object of a second user disposed in a computer of a second information processing apparatus operated by the second user, and the disposed first offensive object of the first user, in the field, and executing a battle process between the first offensive object of the first user and the defensive object of the second user, according to the first user's operation.

With the above feature, in the battle game between the offensive object of the first user and the defensive object of the second user performed according to the first user's operation, the offensive object for attacking the second user and the defensive object for defending against the second user's attack are disposed in a field and displayed, and therefore, an image displayed on the display screen has the element of surprise, and objects can be disposed and observed in both offensive and defensive perspectives. Therefore, the game can be prevented from being monotonous.

The display device may be caused to display the entirety of the field including the disposed first offensive object and defensive object of the first user.

With the above feature, the offensive and defensive objects are concurrently displayed, and therefore, offense and defense in a battle can be displayed in an easy-to-understand manner.

The game program may cause the computer of the first information processing apparatus to further execute: obtaining a result of a battle between the disposed defensive object of the first user and an offensive object of the second user disposed by the second information processing apparatus operated by the second user, wherein the offensive object of the second user and the defensive object of the first user are disposed in a field, and a battle therebetween is performed according to the second user's operation.

With the above feature, the defensive object disposed by the first user and the offensive object disposed by the second user are allowed to fight against each other. Therefore, either of the offensive and defensive objects of the first user can be used to fight against the second user.

The computer of the first information processing apparatus may be allowed to dispose the first offensive object of the first user in a first area of the field. The computer of the first information processing apparatus may be allowed to dispose the defensive object of the first user in a second area of the field different from the first area in which the first offensive object of the first user is disposed.

With the above feature, the offensive and defensive objects of the first user are disposed in different areas of a field. Therefore, these objects are not disposed in the same area in a field, i.e. do not overlap, and therefore, can be clearly seen by the first user.

The game program may cause the computer of the first information processing apparatus to further execute: choosing one of a plurality of kinds of terrains that is to be applied to the field. In this case, the first area may exclude an area in which the disposition of the first offensive object is limited, depending on the chosen terrain. The second area may include an area in which the disposition of the defensive object is limited, depending on the chosen terrain.

With the above feature, in the first area, there is not a limitation on the disposition, and therefore, even when a battle opponent uses any kind of terrain, a battle can be performed with the previous disposition of the offensive object maintained.

The game program may cause the computer of the first information processing apparatus to further execute: choosing a second offensive object of the first user different from the first offensive object disposed in the field, according to the first user's operation. In this case, the battle process may be performed between the first and second offensive objects of the first user and the defensive object of the second user.

With the above feature, an additional offensive object can be disposed to fight against the second user.

The first offensive object of the first user may be disposed in the field according to the first user's operation, by the computer of the first information processing apparatus, before start of the battle process. The second offensive object of the first user may be disposed in the field in which the first offensive object of the first user has been disposed, according to the first user's operation, in response to the start of the battle process.

With the above feature, an additional offensive object can be disposed after observing the formation of the battle opponent's defensive objects.

The game program may cause the computer of the first information processing apparatus to further execute: performing a simulated battle process between the disposed first offensive object and defensive object of the first user in the field including the first offensive object and the defensive object.

With the above feature, a simulated battle can be performed in both offensive and defensive perspectives.

The game program may cause the computer of the first information processing apparatus to further execute: changing an assessment value related to the first user, depending on a result of the battle process, and changing the assessment value, depending on the obtained result of the battle.

With the above feature, the assessment value is changed, depending on the result of a battle, both when the first user is on offense and when the first user is on defense. Therefore, it is necessary to work out not only a strategy for disposition of an offensive object but also a strategy for disposition of a defensive object.

This non-limiting example may also be carried out in the form of an information processing apparatus and a game processing method.

A non-limiting example game system of this non-limiting example includes a plurality of information processing apparatuses including at least a first information processing apparatus operated by a first user and a second information processing apparatus operated by a second user, and a server that communicates with the information processing apparatuses. The first information processing apparatus includes a computer that execute: disposing an offensive object of the first user in a field according to the first user's operation; disposing a defensive object of the first user in the field according to the first user's operation; causing a display device to display at least a portion of the field including the disposed offensive and defensive objects of the first user; and exchanging data with the server. The second information processing apparatus includes a computer that executes: disposing an offensive object of the second user in a field according to the second user's operation; disposing a defensive object of the second user in the field according to the second user's operation; causing a display device to display at least a portion of the field including the disposed offensive and defensive objects of the second user; and exchanging data with the server. The server includes a computer that executes: storing at least data received from the second information processing apparatus; and transmitting the stored data to the first information processing apparatus in response to a request from the first information processing apparatus. The computer of the first information processing apparatus disposes the defensive object of the second user disposed by execution in the computer of the second information processing apparatus and the offensive object of the first user disposed by execution in the computer of the first information processing apparatus, in a field, based on the data received from the server, and executes a battle process between the offensive object of the first user and the defensive object of the second user according to the first user's operation.

With the above feature, before a battle game in which the offensive object of the first user and the defensive object of the second user fight against each other is performed according to the first user's operation, the offensive and defensive objects of the first user are disposed in a field and displayed in the first information processing apparatus, and the offensive and defensive objects of the second user are disposed in a field and displayed in the second information processing apparatus. Therefore, an image displayed in each apparatus has the element of surprise, and the first and second users are each allowed to dispose and observe objects in both offensive and defensive perspectives, and therefore, the game can be prevented from being monotonous.

According to this non-limiting example, a first user's offensive object for attacking a second user, and the first user's defensive object for defending against the second user's attack, are disposed in a field and displayed according to the first user's operation. Therefore, the displayed image has the element of surprise, and the first user is allowed to dispose and observe objects in both offensive and defensive perspectives, and therefore, the game can be prevented from being monotonous.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 9 is a diagram showing a non-limiting example increase or decrease in a rate parameter of a user that occurs when the user attacks a battle opponent, FIG. 10 is a diagram showing a non-limiting example increase or decrease in the rate parameter of a user that occurs when the user defends against a battle opponent's attack.

DETAILED DESCRIPTION OF NON-LIMITING EXAMPLE EMBODIMENTS

Figure 1:
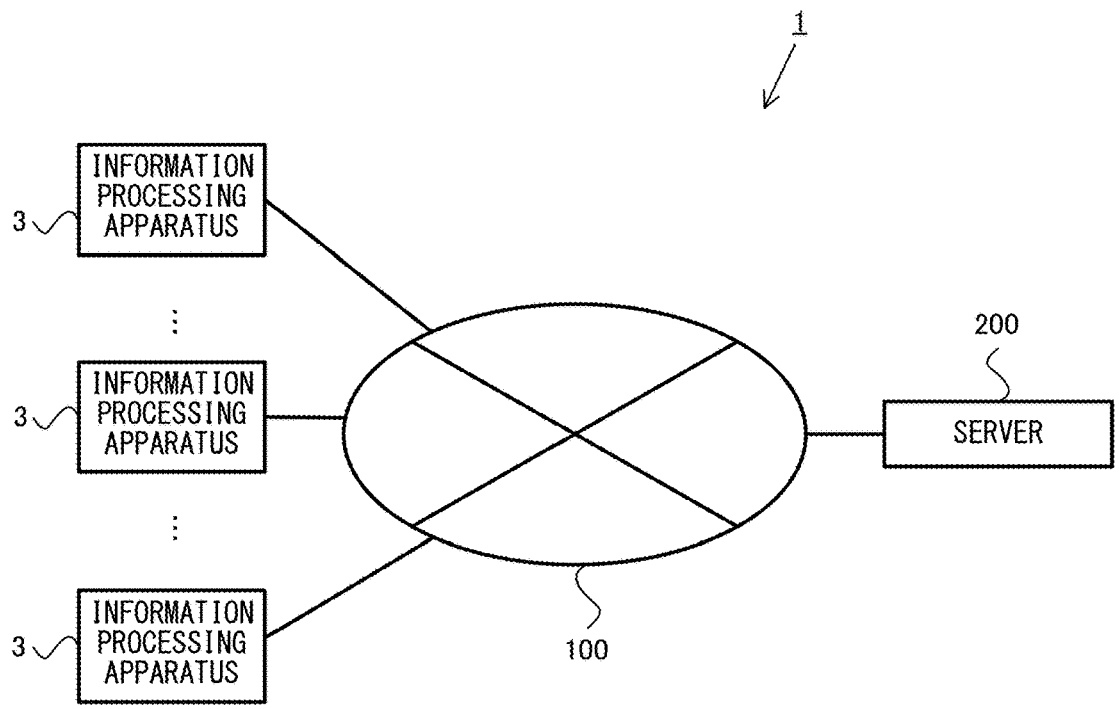
FIG. 1 is a diagram showing a non-limiting example of an information processing system 1 according to this non-limiting example.

An information processing system according to this non-limiting example will be described with reference to FIG. 1. As shown in FIG. 1, an information processing system 1 that is a non-limiting example of the information processing system of this non-limiting example, includes a plurality of information processing apparatuses 3 and a server 200, which are connected together through a network 100.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a device such as a typical personal computer, stationary game machine, mobile telephone (a smartphone, etc.), handheld game console, or personal digital assistant (PDA). In the case where the information processing apparatuses 3 each execute a game application, the information processing system 1 can function as a game system.

Figure 2:
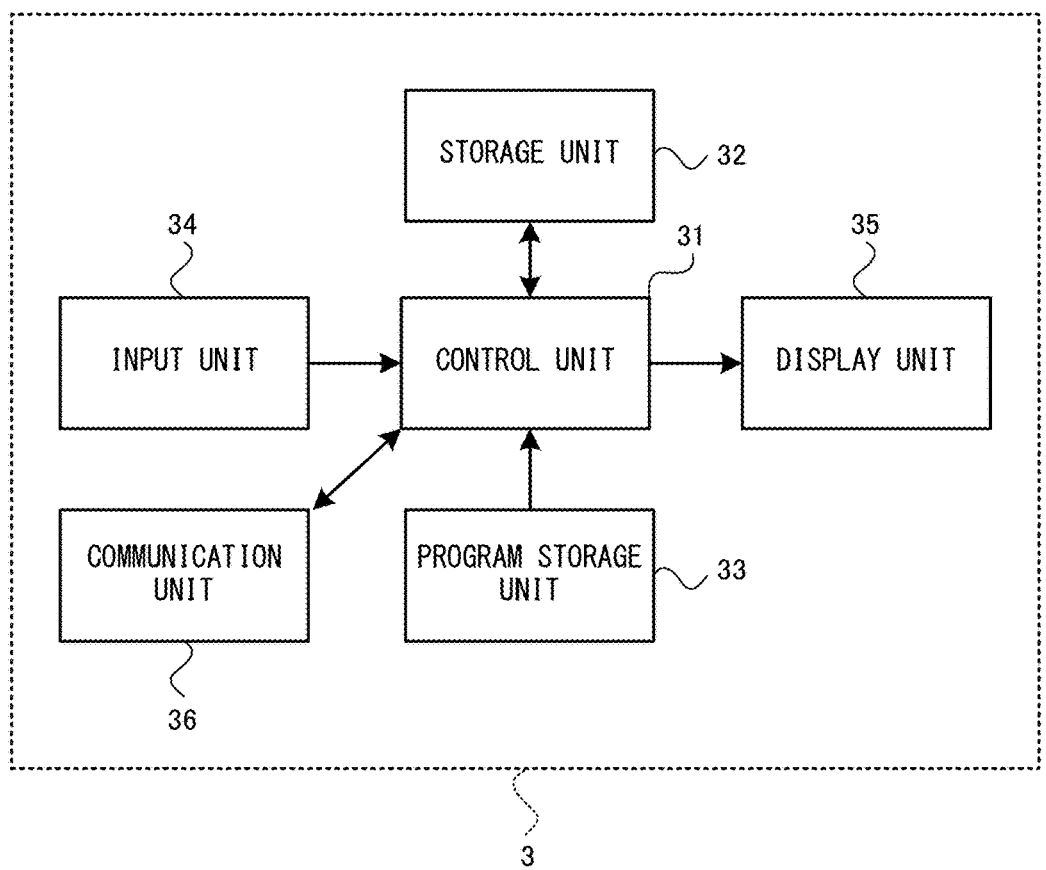
FIG. 2 is a block diagram showing a non-limiting example configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device.

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
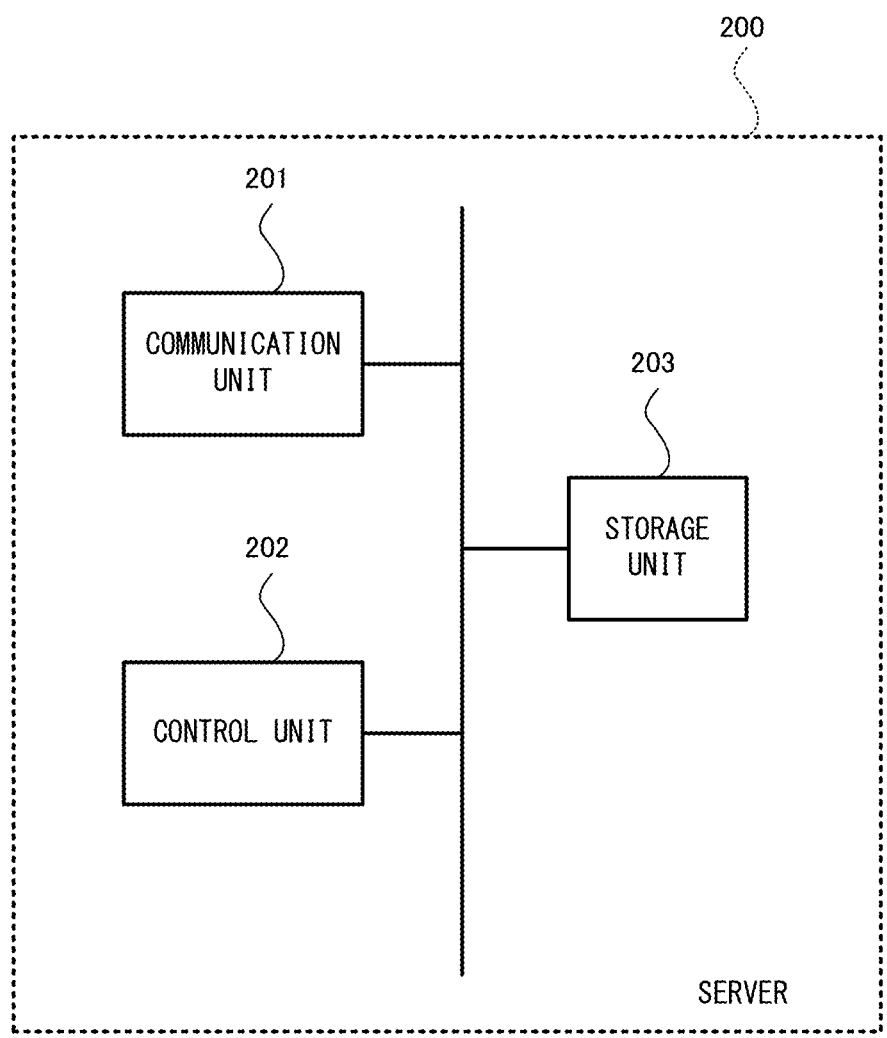
FIG. 3 is a block diagram showing a non-limiting example configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. The control unit 202 performs a process of managing the progression of a game performed along with the information processing apparatuses 3, a process of managing a game map (game field) provided to a user, and a process of managing payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
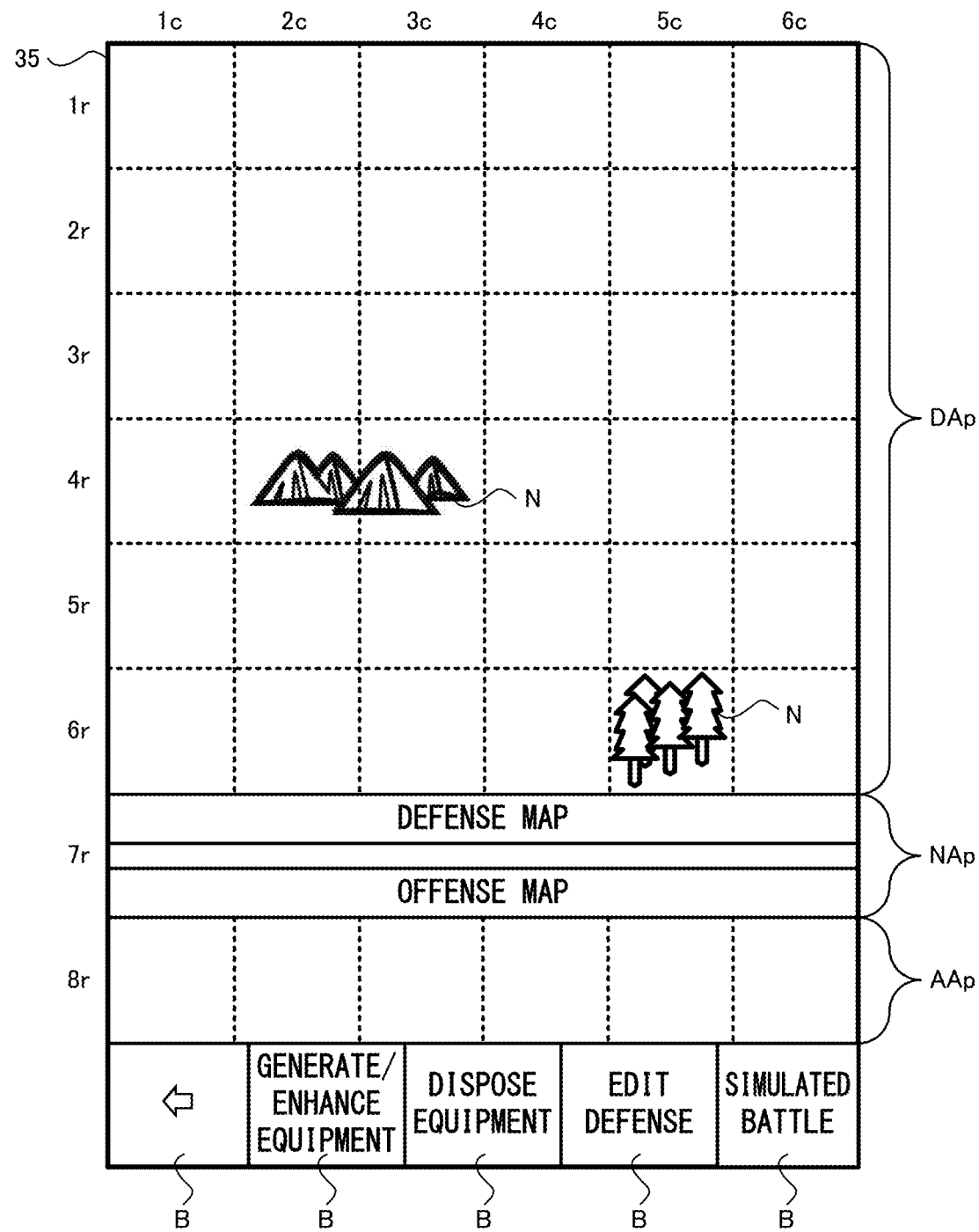
FIG. 4 is a diagram showing a non-limiting example game map (game field) for use in a battle game performed in the information processing apparatus 3.
Figure 5:
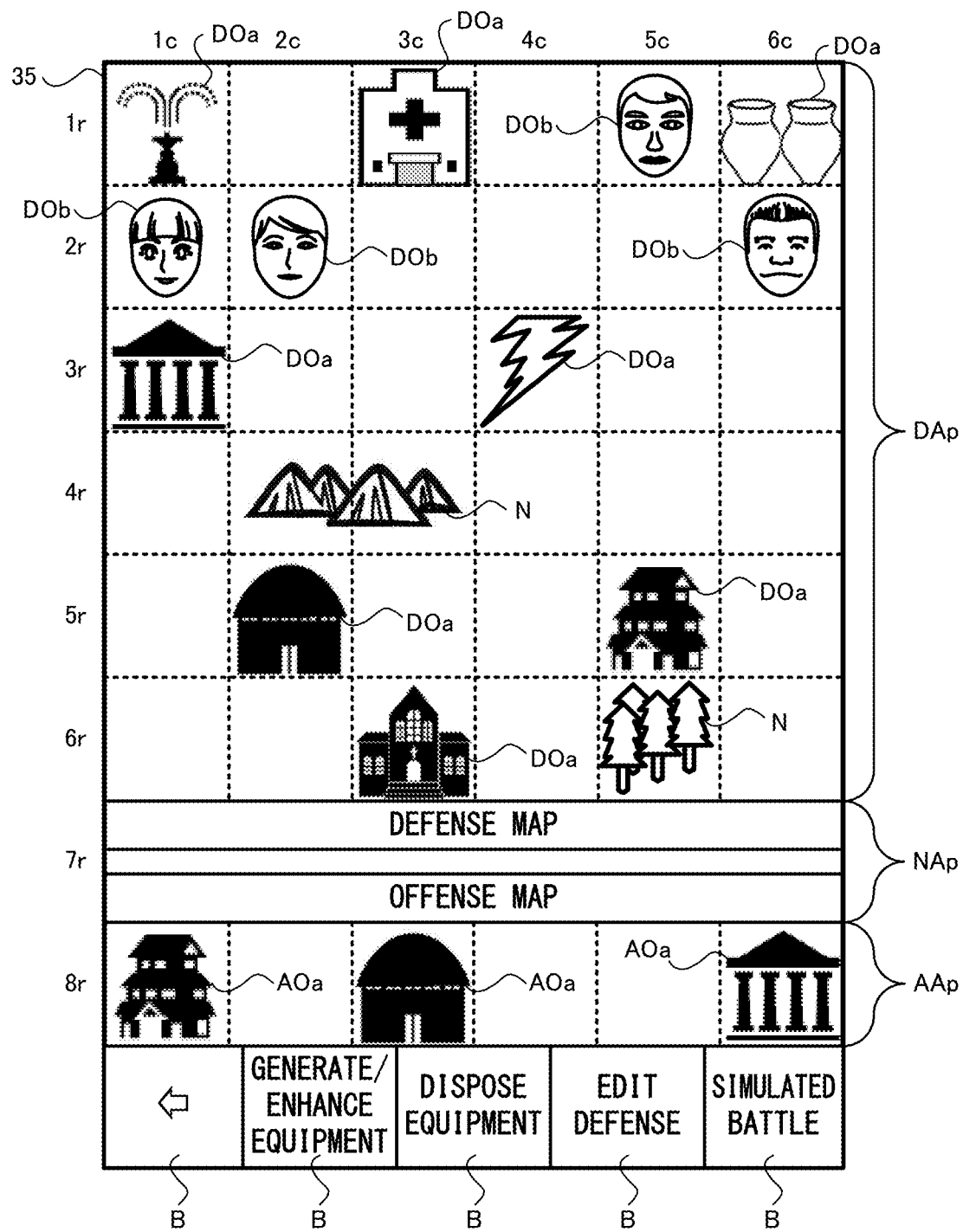
FIG. 5 is a diagram showing a non-limiting example disposition of an own offensive equipment object AOa, an own defensive equipment object DOa, and an own defensive player object DOb on the game map.
Figure 6:
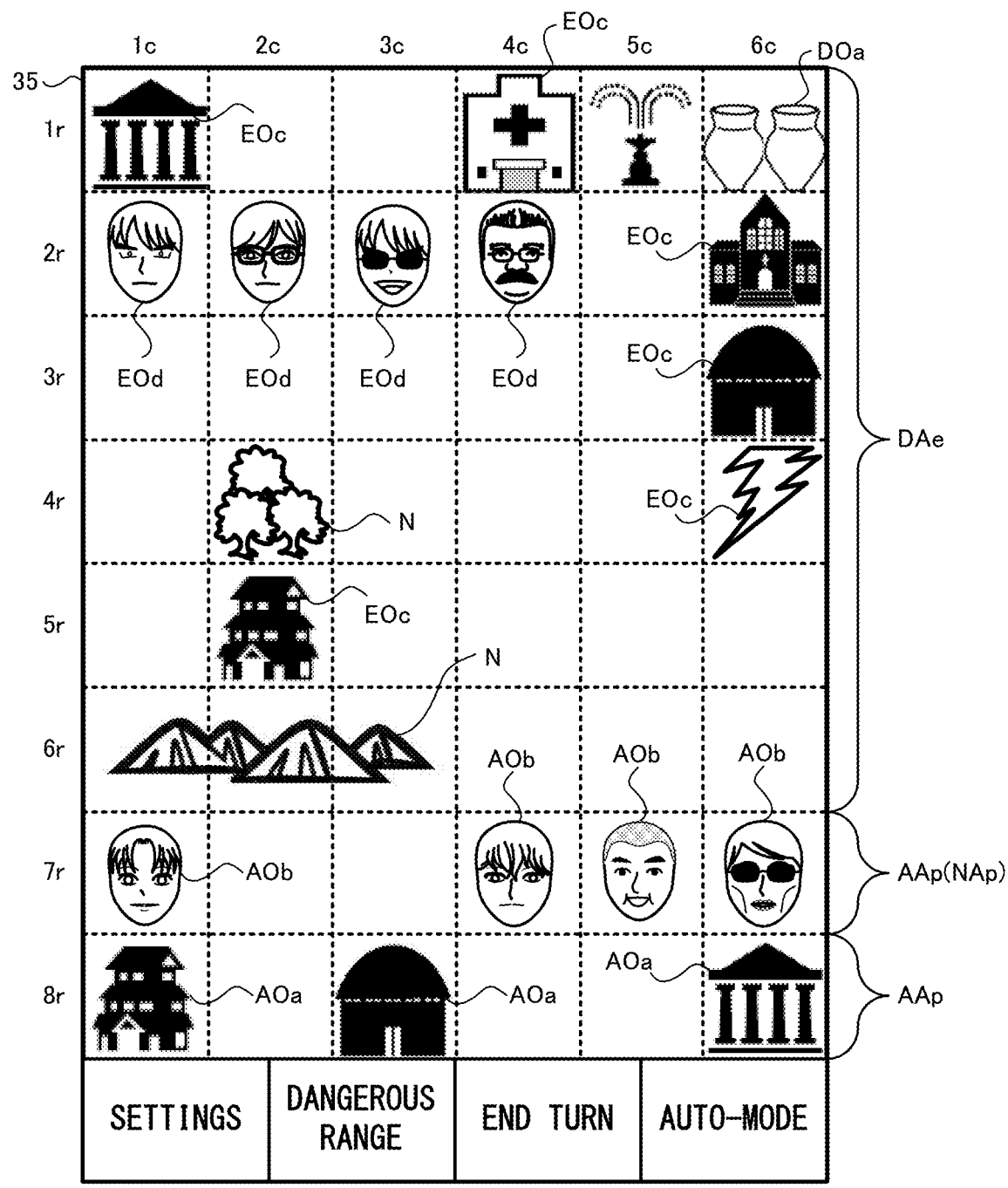
FIG. 6 is a diagram showing non-limiting example attacks performed by an own offensive equipment object AOa and an own offensive player object AOb using an opponent's defense map.
Figure 7:
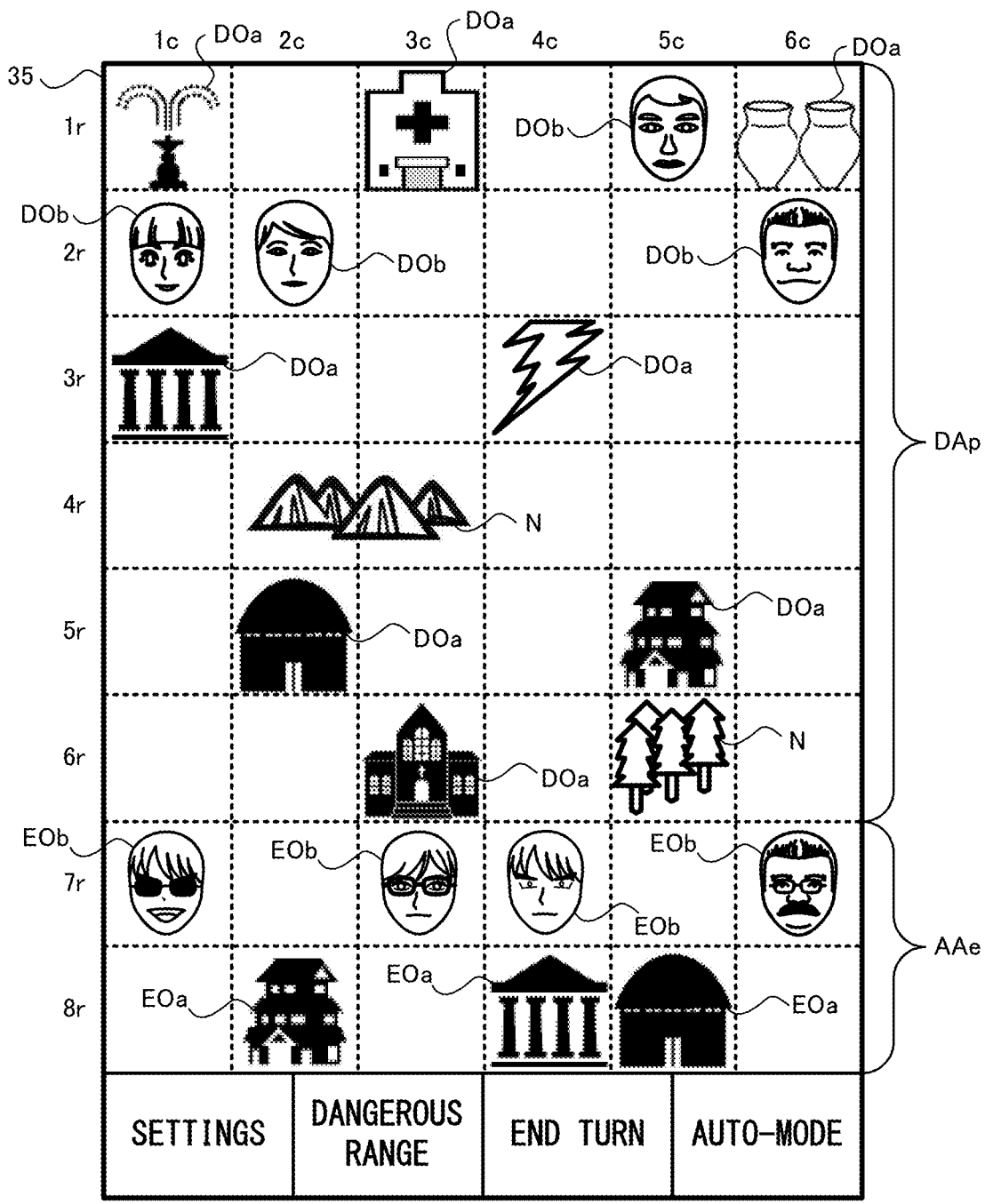
FIG. 7 is a diagram showing non-limiting example attacks performed by an opponent offensive equipment object EOa and an opponent offensive player object EOb using an own defense map.
Figure 8:
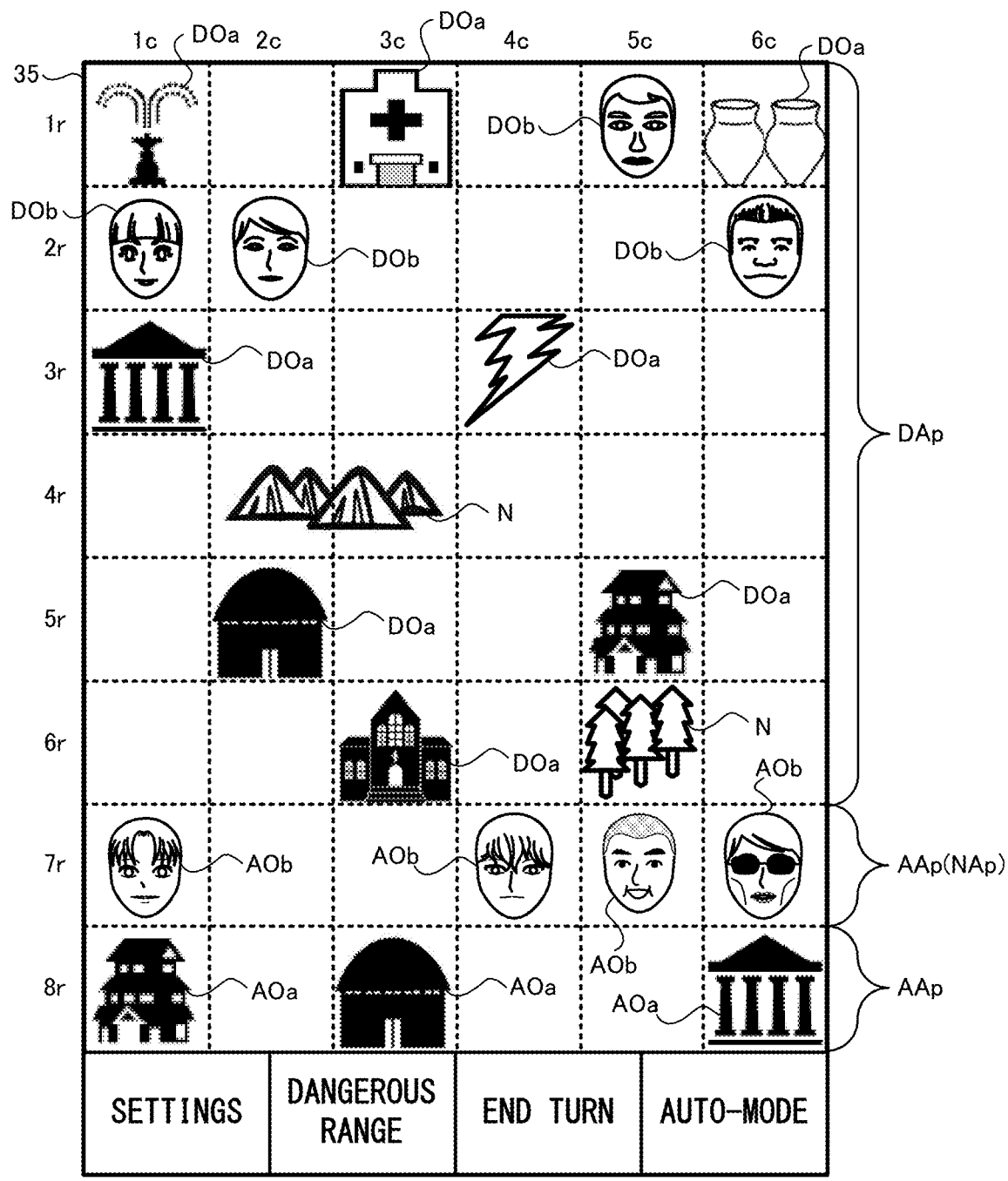
FIG. 8 is a diagram showing a non-limiting example simulated battle performed between an own defensive equipment object DOa and an own defensive player object DOb, and an own offensive equipment object AOa and an own offensive player object AOb, using an own defense map.

Next, before describing specific processes performed by the information processing apparatus 3 when the information processing apparatus 3 is connected to the server 200, a non-limiting example process performed in the information processing system 1 will be outlined with reference to FIGS. 4-10. Note that FIG. 4 is a diagram showing a non-limiting example game map (game field) for use in a battle game performed in the information processing apparatus 3. FIG. 5 is a diagram showing a non-limiting example disposition of an own offensive equipment object AOa, an own defensive equipment object DOa, and an own defensive player object DOb on the game map. FIG. 6 is a diagram showing non-limiting example attacks performed by an own offensive equipment object AOa and an own offensive player object AOb using an opponent's defense map. FIG. 7 is a diagram showing non-limiting example attacks performed by an opponent offensive equipment object EOa and an opponent offensive player object EOb using an own defense map. FIG. 8 is a diagram showing a non-limiting example simulated battle performed between an own defensive equipment object DOa and an own defensive player object DOb, and an own offensive equipment object AOa and an own offensive player object AOb, using an own defense map. FIG. 9 is a diagram showing a non-limiting example increase or decrease in a rate parameter of a user that occurs when the user attacks a battle opponent. FIG. 10 is a diagram showing a non-limiting example increase or decrease in the rate parameter of a user that occurs when the user defends against a battle opponent's attack. In the description that follows, an application for performing a battle game is used as a non-limiting example application executed in the information processing apparatus 3. Alternatively, an application for performing another game or an application that is not a game may be executed in the information processing apparatus 3.

A non-limiting example game map used in a battle game performed in the information processing apparatus 3 will be described with reference to FIG. 4. In the battle game of this non-limiting example, a plurality of objects possessed by a user can appear and fight against another user's object that is a battle opponent, using a game map. For instance, in this non-limiting example, a player's turn (offense turn) in which a user operates an offensive object and an opponent's turn (defense turn) in which a computer that is a battle opponent controls a defensive character set by another user so as to operate the defensive character alternate. By the player and the opponent taking turns, a battle game is performed between an offensive object and a defensive object. For example, by operating the input unit 34 in the player's turn, a user can operate a plurality of offensive objects disposed on a game map, and the game map as viewed from above is displayed on the display unit 35. The game map is, for example, a two-dimensional map, in which a plurality of areas where an object possessed by a user can be disposed are formed and arranged in a grid pattern. For instance, in each area, a single object possessed by a user can be disposed, and a plurality of areas are formed and arranged in a grid pattern having eight rows and six columns (rows 1r-8r and columns 1c-6c).

The user of the information processing apparatus 3 is allowed to edit a game map by choosing "edit map" in a menu of the battle game. The game map has a defense map area DAp for disposing a defensive object for defending against an attack from an object of another user who is a battle opponent, and an offense map area AAp for disposing an offensive object for attacking an object of another user who is a battle opponent. In the non-limiting example of FIG. 4, the defense map area DAp is set in the first row to the sixth row (rows 1r-6r) in the above grid-pattern area. The offense map area AAp is set in the eighth row (row 8r) in the above grid-pattern area. In the seventh row (row 7r) of the above grid-pattern area, which is located between the defense map area DAp and the offense map area AAp, a neutral map area NAp is set where an object cannot be disposed in map editing. As described below, when a battle game is performed, the neutral map area Nap functions as an offense map area where the user's offensive object (specifically, an own offensive player object AOb) can be disposed. The user of the information processing apparatus 3 can edit the game map by disposing a player object or equipment object possessed by the user themselves in the defense map area DAp and the offense map area AAp. Note that in this non-limiting example, the offense map area AAp is used as a non-limiting example of a first area, and the defense map area DAp is used as a non-limiting example of a second area.

The user of the information processing apparatus 3 is allowed to choose a game map to be edited, by choosing a terrain to be used in a battle from a plurality of kinds of terrains previously prepared. For instance, on the game map, a terrain object N such as a forest, mountain, pond, or wall is disposed, depending on the chosen terrain, and in map editing, a player object or equipment object possessed by the user cannot be disposed on terrain objects N. Terrain objects N are a player object which cannot be invaded or attacked even in a battle game.

As shown in FIG. 5, an equipment object and player object that are possessed by the user themselves can be disposed on the defense map area DAp of the game map. When an equipment object possessed by the user themselves is disposed in the defense map area DAp, the equipment object functions as an own defensive equipment object DOa. When a player object possessed by the user themselves is disposed in the defense map area DAp, the player object functions as an own defensive player object DOb. Thereafter, the own defensive equipment object DOa and the own defensive player object DOb, when fighting against another user's object (offensive object), serve as a defensive object for defending an own territory. Note that in this non-limiting example, own defensive equipment objects DOa and own defensive player objects DOb are used as a non-limiting example defensive object disposed by a second disposing means.

For instance, own defensive equipment objects DOa include a building object and weapon object that cause damage to another user's object (offensive object) disposed in a predetermined range, and increase/restore an ability of an own object (defensive object) disposed in a predetermined range, to enhance offensive power, a trap object that causes damage to another user's object (offensive object) that is invading or intruding, and limits the amount of movement of such an invading or intruding object, an obstruction object that obstructs invasion or intrusion of an object, etc. For instance, as shown in FIGS. 4 and 5, on a display screen for map editing, an "equipment disposition" operation button B is provided for calling an equipment object possessed by the user themselves and disposing the equipment object on a game map (defense map area DAp). By performing an operation of choosing the "equipment disposition" operation button B, an equipment object to be disposed on a game map (defense map area DAp) can be chosen from those possessed by the user themselves.

Own defensive equipment objects DOa may also include a building object (e.g., own defensive equipment objects DOa disposed at the intersection of row 1r and column 1c and the intersection of row 1r and column 6c in FIG. 5) that gives a bonus to another user when the building object is destroyed during a battle by that user attacking the own object. For instance, when an own defensive equipment object DOa that gives the bonus is destroyed during a battle, a predetermined portion of a participation parameter (e.g., an energy parameter) that is required when the user participates to a battle game on offense, may be given to another user who has been successful in the destruction. For instance, the predetermined portion that is given to a user who has been successful in the destruction may be calculated based on an assessment value (e.g., a rate parameter described below) of that user, or may be calculated so that the predetermined portion that is given to the user is increased with an increase in the assessment value. Note that as another example, when an own defensive equipment object DOa that gives the bonus is destroyed during a battle, the user suffering the destruction may be deprived of a predetermined portion of the participation parameter in addition to the bonus.

Own defensive equipment objects DOa can be moved (e.g., dragged) according to the user's operation (e.g., a drag operation on a touch panel) and disposed again in the defense map area DAp, if during map editing, except for on a terrain object N. However, own defensive equipment objects DOa function as an object for defense in the defense map area DAp, and therefore, cannot be moved into the offense map area AAp or the neutral map area NAp.

An equipment object that is disposed as an own defensive equipment object DOa in the defense map area DAp can be newly generated or upgraded during map editing. For instance, as shown in FIGS. 4 and 5, on the display screen for map editing, an "equipment generation/enhancement" operation button B is provided for generating or upgrading an equipment object. By performing an operation of choosing the "equipment generation/enhancement" operation button B, an equipment object possessed by the user themselves can be newly added, or an equipment object possessed by the user themselves or an equipment object disposed on a game map (defense map area DAp) may be upgraded.

Own defensive player objects DOb are a player object (game character) that fights against another user's object (offensive object). A plurality of (e.g., four) own defensive player objects DOb are chosen from characters possessed by the user and are disposed in the defense map area DAp, except for on a terrain object N. Here, an area where an own defensive player object DOb can be disposed may be further limited in the defense map area DAp. For instance, the area where an own defensive player object DOb can be disposed may be limited to the first and second rows (rows 1r and 2r) in the defense map area DAp. This can provide a space between an own defensive player object DOb and an offensive object on a game map, and therefore, the situation that a battle opponent attacks immediately after the start of a battle can be avoided. A character chosen as an own defensive player object DOb may be previously chosen from characters possessed by the user before map editing, or may be chosen from characters possessed by the user during map editing.

For an own defensive player object DOb that appears in the game of this non-limiting example, a plurality of ability values are set that are used when the own defensive player object DOb fights against an offensive object of another user as a battle opponent. For instance, for each player object, ability values indicating a hit point (HP: lethal offensive strength), offensive strength, defensive strength, speed, magic offensive power, etc., are set. Own defensive player objects DOb can attack another user's offensive object, defend against an attack from another user's offensive object, and move on a game map, depending on the ability values. When the value of HP of an own defensive player object DOb is lowered to a threshold (e.g., the value of HP is lowered to zero), the own defensive player object DOb disappears from a game map.

Own defensive player objects DOb can be moved (e.g., dragged) according to the user's operation (e.g., a drag operation on a touch panel) and disposed again in the defense map area DAp, if during map editing, except for on a terrain object N. However, own defensive player objects DOb function as an object for defense in the defense map area DAp, and therefore, cannot be moved into the offense map area AAp or the neutral map area NAp.

As shown in FIG. 5, an equipment object possessed by the user themselves can be disposed in the offense map area AAp of the game map during map editing. By disposing an equipment object possessed by the user themselves in the offense map area AAp, the equipment object is allowed to function as an own offensive equipment object AOa. In this case, the own offensive equipment object AOa, when fighting against another user's object (defensive object), serves as an offensive object that attacks the opponent's territory. Note that in this non-limiting example, own offensive equipment objects AOa are used as a non-limiting example of an offensive object that is disposed by a first disposing means.

For instance, own offensive equipment objects AOa include a building object and weapon object that cause damage to another user's object (defensive object) disposed in a predetermined range, and increase/restore an ability of an own object (offensive object) disposed in a predetermined range, to enhance offensive power, etc. For instance, as shown in FIGS. 4 and 5, on a display screen for map editing, an "equipment disposition" operation button B is provided for calling an equipment object possessed by the user themselves and disposing the equipment object on a game map (the offense map area AAp). By performing an operation of choosing the "equipment disposition" operation button B, an equipment object to be disposed on a game map (the offense map area AAp) can be chosen from those possessed by the user themselves.

Own offensive equipment objects AOa can be moved (e.g., dragged) according to the user's operation (e.g., a drag operation on a touch panel) and disposed again in the offense map area AAp, if during map editing, except for on a terrain object N. However, own offensive equipment objects AOa function as an object for offense in the offense map area AAp, and therefore, cannot be moved into the defense map area DAp or the neutral map area NAp.

Here, as can be seen from in FIGS. 4 and 5, in the offense map area AAp, no terrain object N is disposed, on which a player object or equipment object possessed by the user themselves cannot be disposed. In other words, there is a limitation on the disposition of a defensive object due to a terrain object N in the defense map area DAp, and there is not a limitation on the disposition of an offensive object due to a terrain object N in the offense map area AAp. Thus, in the offense map area AAp, there is not a limitation on the disposition of an offensive object due to a terrain object N, and therefore, a battle can be performed with the previous disposition of an offensive object remaining unchanged, even when a battle opponent uses any map (e.g., a defense map area DAe described below). The offense map area AAp, where the user is allowed to dispose an offensive object, does not overlap the defense map area DAp, where the user is allowed to dispose a defensive object, and therefore, display that is easy for the user to see can be provided. Furthermore, by providing the neutral map area Nap, where an offensive object or defensive object cannot be disposed, between the offense map area AAp and the defense map area DAp, an offensive troop and a defensive troop can be more easily distinguished from each other, and as shown in FIG. 5, labels indicating the offense map area and the defense map area, respectively, can be displayed in the neutral map area NAp.

An equipment object that is disposed as an own offensive equipment object AOa in the offense map area AAp can be newly generated or upgraded during map editing. For instance, as shown in FIGS. 4 and 5, by performing an operation of choosing the "equipment generation/enhancement" operation button B provided on the display screen for map editing, an equipment object possessed by the user themselves can be newly added, or an equipment object possessed by the user themselves or an equipment object disposed on a game map (in the offense map area AAp) can be upgraded.

When the user of the information processing apparatus 3 has ended map editing, the game map thus edited (typically, the defense map area DAp produced by the user performing map editing) is transmitted to the server 200 and temporarily stored in the storage nit 203, i.e. registered. Thereafter, by accessing the server 200, another user who operates another information processing apparatus 3 can perform a battle game in which the second user's offensive object, on offense, attacks the game map (the defense map area DAp) registered in the server 200.

Note that a player object possessed by the user themselves, when disposed in the offense map area AAp, functions as an own offensive player object AOb. However, during map editing, an own offensive player object AOb cannot be disposed. When a battle is performed against another user or a simulated battle is performed between own objects as described below, the neutral map area NAp is changed to the offense map area AAp, in which an offensive object can be disposed. Therefore, after the neutral map area NAp has been changed to the offense map area AAp, a player object possessed by the user themselves can be disposed as an own offensive player object AOb in the offense map area AAp. Thereafter, the own offensive player object AOb serves as an offensive object that attacks an opponent's territory in a battle against another user's object (defensive object).

By choosing "fight against another user" in the menu of the battle game, the user of the information processing apparatus 3 can fight against another user using the edited game map. For instance, when the user of the information processing apparatus 3 chooses "fight against another user," the user of the information processing apparatus 3, on offense, can fight against another user by consuming a participation parameter (e.g., an energy parameter) corresponding to the assessment value (e.g., a rate parameter described below) of the user. Note that the amount of the participation parameter (energy parameter) consumed by performing the battle may be set to a greater value as the user has a greater assessment value (e.g., a rate parameter described below). In this case, if the participation parameter (possessed amount) possessed by the user is smaller than an amount (consumed amount) that is to be consumed in the battle, the user cannot fight, on offense, against another user. The participation parameter possessed by the user can spontaneously increase as time passes, or can be acquired, depending on the result of a battle against another user (e.g., destruction of a defensive equipment that gives a bonus). Therefore, the user increases the participation parameter using any of such means in order to participate in a battle game on offense.

When the user of the information processing apparatus 3 participates in a battle on offense, an offensive object disposed in the offense map area AAp prepared by the user performing map editing, and a defensive object disposed in the defense map area DAe prepared by another user performing map editing, are combined on a single game map, and fight against each other. Specifically, when the user of the information processing apparatus 3 chooses "fight against another user" in the menu of the battle game, the participation parameter is consumed and thereafter the server 200 matches the user of the information processing apparatus 3 up with a battle opponent which is another user, and the battle opponent is displayed. Thereafter, the user of the information processing apparatus 3 observes the battle opponent's game map (i.e., the defense map area DAe where another user's defensive object is disposed) which is registered in the server 200, and starts a battle between the user's offensive object and the battle opponent's defensive object.

As shown in FIG. 6, when a game starts in which the user of the information processing apparatus 3 fights, on offense, against another user, a game map in which the offense map area AAp (and the neutral map area NAp) in which an offensive object has been disposed by the user of the information processing apparatus 3 performing map editing and the defense map area DAe in which a defensive object has been disposed by another user performing map editing are combined, is generated as a game map for a battle. In other words, the user's offensive object (own offensive equipment object AOa) previously disposed in the offense map area AAp by map editing, and another user's defensive object (an opponent defensive equipment object EOc and an opponent defensive player object EOd) previously disposed in the defense map area DAe by map editing, fight against each other. Note that in this non-limiting example, as a non-limiting example of another user's defensive object disposed by a second disposing means that functions in a computer of another information processing apparatus operated by that user, an opponent defensive equipment object EOc and an opponent defensive player object EOd are used.

In a game map that is produced during the start of a game in which the user of the information processing apparatus 3 fights against another user, the neutral map area NAp (i.e., the seventh row (row 7r) in the grid-pattern area of the game map) is changed to an offense map area AAp. The user, on offense, is allowed to newly dispose a player object possessed by the user themselves, as an own offensive player object AOb, in the offense map area AAp replacing the neutral map area NAp. The own offensive player object AOb thus added serves as an offensive object that attacks another user's defensive object. Specifically, while the user's own offensive equipment object AOa disposed in the offense map area AAp, and another user's opponent defensive equipment object EOc and opponent defensive player object EOd disposed in the defense map area DAe, need to be previously set without knowing a battle opponent, the user is allowed to newly dispose an own offensive player object AOb in the offense map area AAp replacing the neutral map area NAp after viewing the line-up of battle opponents. Note that in this non-limiting example, own offensive player objects AOb are used as a non-limiting example of another offensive object different from offensive objects disposed in the field.

When the user of the information processing apparatus 3 is competing against another user, the user of the information processing apparatus 3 is allowed to choose an object to be operated in the player's turn from a plurality of own offensive player objects AOb by performing a predetermined operation using the input unit 34. Thereafter, the user is allowed to move the own offensive player object AOb to be operated, on a game map, and cause the own offensive player object AOb to attack the battle opponent's defensive object (an opponent defensive equipment object EOc and an opponent defensive player object EOd) on the game map, by performing a predetermined operation. Here, the distance that an own offensive player object AOb can be moved on a game map in a single player's turn is limited, and the user is allowed to move an own offensive player object AOb within the limitation in the player's turn. Note that the distance that an own offensive player object AOb can be moved on a game map in a single player's turn may be set for each of the attribute, ability, etc., of the own offensive player object AOb. In the case where a game map is formed of grid-pattern cells in which each object can be disposed, the limited distance (maximum movement distance) that an own offensive player object AOb can be moved on a game map in a single player's turn may be defined using the number of cells, e.g. may be set so that an own offensive player object AOb can be moved by 1-3 cells, depending on each of the attribute, ability value, etc., thereof.

An own offensive player object AOb can attack, in the player's turn, the battle opponent's defensive object, depending on a positional relationship between these objects. For instance, if the positional relationship between an own offensive player object AOb to be operated and a defensive object is such that the distance therebetween allows the own offensive player object AOb to attack the defensive object (e.g., a positional relationship (distance) in which the own offensive player object AOb and the defensive object are adjacent to each other), the user is allowed to attack the defensive object by performing a predetermined operation. When a life parameter (e.g., a hit point) possessed by the defensive object is exceeded by the attack effect of the own offensive player object AOb (the hit point of the defensive object becomes zero), the defensive object is toppled or destroyed and disappears from the game map. Note that the maximum attack distance in which an own offensive player object AOb can attack a defensive object may be set for each of the attribute, ability value, etc., of the own offensive player object AOb. The maximum attack distance may be set so that even when an own offensive player object AOb is located away from a defensive object on a game map, then if the distance therebetween is within the maximum attack distance, the own offensive player object AOb can attack the defensive object. For instance, in the case where a game map is formed of grid-pattern cells in which each object can be disposed, the maximum attack distance may be set so that an own offensive player object AOb can attack a defensive object located 1 or 2 cells away from the own offensive player object AOb, depending on each of the attribute and ability value of the own offensive player object AOb.

During the start or end of the player's turn, an own offensive equipment object AOa automatically exerts an effect possessed by the own offensive equipment object AOa on a game map. For instance, an own offensive equipment object AOa causes damage to a defensive object disposed within a predetermined range, or increases/restores the ability of an own offensive player object AOb disposed within a predetermined range to enhance the offensive strength of the own offensive player object AOb.

When all offensive objects disposed on a game map have ended their actions (movement, offense, defense, waiting, etc.) or when the user performs a predetermined operation (e.g., an operation of choosing an "end turn" operation button to instruct to end a turn; by this operation, it is assumed that all offensive objects have ended their actions), the player's turn ends, and the opponent's turn (defense turn) starts. For instance, in the opponent's turn, the control unit 31 performs control so that an opponent defensive player object EOd moves on a game map, and an opponent defensive equipment object EOc and an opponent defensive player object EOd attack an own offensive equipment object AOa and an own offensive player object AOb on the game map. For instance, when a positional relationship between an opponent defensive equipment object EOc or an opponent defensive player object EOd, and an own offensive player object AOb, is such that the distance therebetween allows the opponent defensive equipment object EOc or opponent defensive player object EOd to attack the own offensive player object AOb, the control unit 31 may perform control so that the opponent defensive equipment object EOc or opponent defensive player object EOd attacks the own offensive player object AOb. When a life parameter (e.g., a hit point) possessed by the own offensive player object AOb is exceeded by the attack effect of the opponent defensive equipment object EOc or opponent defensive player object EOd (the hit point of the own offensive player object AOb becomes zero), the own offensive player object AOb is toppled and disappears from the game map. When a positional relationship between an opponent defensive equipment object EOc or an opponent defensive player object EOd, and an own offensive equipment object AOa, is such that the distance therebetween allows the opponent defensive equipment object EOc or opponent defensive player object EOd to attack the own offensive equipment object AOa, the control unit 31 may perform control so that the opponent defensive equipment object EOc or opponent defensive player object EOd to attack the own offensive equipment object AOa. When a withstanding parameter (e.g., a hit point) possessed by the own offensive equipment object AOa is exceeded by the attack effect of the opponent defensive equipment object EOc or opponent defensive player object EOd, the own offensive equipment object AOa is destroyed and the presence of the own offensive equipment object AOa is made ineffective on the game map.

When all defensive objects disposed on the game map have ended their actions, the opponent's turn ends, and the player's turn starts again. The above battle game proceeds by such alternation of the player's turn and the opponent's turn, and ends when a predetermined number of turns have been performed. When all opponent defensive player objects EOd have been defeated before the predetermined number of turns is reached, the user of the information processing apparatus 3, on offense, wins, and another user as a battle opponent, on defense, loses. When at least one opponent defensive player object EOd is alive after the predetermined number of turns have been performed, another user as a battle opponent, on defense, wins, and the user of the information processing apparatus 3, on offense, loses.

The user of the information processing apparatus 3 may be on defense in the battle game when the server 200 matches the user of the information processing apparatus 3 up, as a battle opponent, with another user. When the user of the information processing apparatus 3 is matched up, as a defense side, with another user, a battle game is performed with a defensive object disposed in the defense map area DAp which has been produced by the user of the information processing apparatus 3 performing map editing and registered in the server 200, and an offensive object disposed in the offense map area AAe which has been produced by the second user performing map editing, combined on a single game map.

As shown in FIG. 7, when a game is started where the user of the information processing apparatus 3 is on defense and fights against another user, a game map on which the defense map area DAp in which a defensive object is disposed by the user of the information processing apparatus 3 performing map editing and the offense map area AAe in which an offensive object is disposed by another user are combined is generated as a game map for a battle. Specifically, the user's defensive object (an own defensive equipment object DOa and an own defensive player object DOb) previously disposed in the defense map area DAp by map editing fights against another user's offensive object (an opponent offensive equipment object EOa) previously disposed in the offense map area AAe by map editing. Thereafter, when the second user as a battle opponent additionally disposes an opponent offensive player object EOb as an offensive object that attacks a defensive object, a battle game in which the user of the information processing apparatus 3 is on defense is started. Note that the battle game in which the user of the information processing apparatus 3 is on defense proceeds in a manner similar to that of the above battle game in which the user of the information processing apparatus 3 is on offense, except that an entity that controls objects is changed, and therefore, will not be described in detail. Briefly, an offensive object on a game map is operated according to an operation performed by another user as a battle opponent's in the player's turn (offense turn), and a defensive object (an own defensive equipment object DOa and an own defensive player object DOb) in the defense map area DAp previously set by the user of the information processing apparatus 3 performing map editing and registered in the server 200 is operated according to control performed by the control unit 31 in the opponent's turn (defense turn).

By performing an operation of choosing "simulated battle" in the menu during map editing (e.g., an operation of choosing a "simulated battle" operation button B of FIGS. 4 and 5), the user of the information processing apparatus 3 can perform a simulated battle between a defensive object and an offensive object that are possessed by the user themselves, using a game map which is being edited.

As shown in FIG. 8, when the user of the information processing apparatus 3 performs a simulated battle, an offensive object (own offensive equipment object AOa) disposed in the offense map area AAp produced by the user performing map editing, and a defensive object (an own defensive equipment object DOa and an own defensive player object DOb) disposed in the defense map area DAp produced by the user performing map editing, fight a simulated battle on a single game map. The user, when choosing a simulated battle, is allowed to newly dispose a player object possessed by the user themselves as an own offensive player object AOb in the offense map area AAp replacing the neutral map area NAp. When an own offensive player object AOb is added as an offensive object that attacks the user's defensive object, the simulated battle is started. Note that the simulated battle proceeds in a manner similar to the above battle game in which the user of the information processing apparatus 3 is on offense, except that objects possessed by the user themselves fight against each other in the simulated battle. Specifically, the user's offensive object (an own offensive equipment object AOa and an own offensive player object AOb) on the game map is operated according to the user's operation in the player's turn (offense turn), and the user's defensive object (an own defensive equipment object DOa and an own defensive player object DOb) on the game map is operated according to control performed by the control unit 31 in the opponent's turn (defense turn). Thus, by causing a defensive object and an offensive object disposed by the user themselves performing map editing to fight a simulated battle, the disposition of objects can be previously studied in terms of defense and offense, and an optimum disposition of objects can be verified for an assumed battle opponent. For instance, by performing a simulated battle using a defense map copying a defensive formation of another user who has been matched up, a game plan for defeating that user can be worked out.

When the user fights a battle game with another user as a battle opponent, a rate parameter of the user is changed. The rate parameter is used to determine a user ranking for each user who can participate in the battle game, and is also used to estimate the proficiency, experience point, game level, etc., of each user in the battle game. An example will now be described in which the rate parameters of four player objects on offense and four player objects on defense appearing in a battle game are changed during the battle game.

For instance, as shown in FIG. 9, when the user, on offense, fights against a battle opponent and wins the battle game with all (e.g., four) player objects (i.e., own offensive player objects AOb) remaining on the game field, the rate parameter of the user, who is on offense and is a winner, is increased by 80 points. When the user, on offense, fights against a battle opponent and wins the battle game with one of the user's own offensive player objects AOb disappearing from the game field (e.g., three objects remaining), the rate parameter of the user, who is on offense and is a winner, is increased by 60 points. When the user, on offense, fights against a battle opponent and wins the battle game with two of the user's own offensive player objects AOb disappearing from the game field (e.g., two objects remaining), the rate parameter of the user, who is on offense and is a winner, is increased by 40 points. When the user, on offense, fights against a battle opponent and wins the battle game with three of the user's own offensive player objects AOb disappearing from the game field (e.g., one object remaining), the rate parameter of the user, who is on offense and is a winner, is increased by 20 points. Meanwhile, when the user, on offense, fights against a battle opponent and loses the battle game with all of the user's own offensive player objects AOb disappearing from the game field, the rate parameter of the user, who is on offense and is a loser, is not changed. When the user, on offense, fights against a battle opponent, then if at least one opponent defensive player object EOd remains at the time that the predetermined number of turns is reached, the user, on offense, loses, and the rate parameter of the user, on offense, is not changed. Thus, when the user, on offense, fights against a battle opponent, the rate parameter possessed by the user is increased only if the user wins the battle, and the larger the number of own offensive player objects AOb remaining is, the more the rate parameter is increased.

For instance, as shown in FIG. 10, when the user, on defense, is matched up with a battle opponent in a battle game and is attacked by the battle opponent, then if the user loses the battle game with all (e.g., four) player objects (i.e., opponent offensive player objects EOb) of the battle opponent remaining on the game field, the rate parameter of the user, who is on defense and is a loser, is decreased by 80 points. When the user, on defense, is matched up with a battle opponent in a battle game and is attacked by the battle opponent, then if the user loses the battle game with one of the opponent offensive player objects EOb of the battle opponent disappearing from the game field (i.e., three objects remaining), the rate parameter of the user, who is on defense and is a loser, is decreased by 60 points. When the user, on defense, is matched up with a battle opponent in a battle game and is attacked by the battle opponent, then if the user loses the battle game with two of the opponent offensive player objects EOb of the battle opponent disappearing from the game field (i.e., two objects remaining), the rate parameter of the user, who is on defense and is a loser, is decreased by 40 points. When the user, on defense, is matched up with a battle opponent in a battle game and is attacked by the battle opponent, then if the user loses the battle game with three of the opponent offensive player objects EOb of the battle opponent disappearing from the game field (i.e., one object remaining), the rate parameter of the user, who is on defense and is a loser, is decreased by 20 points. Meanwhile, when the user, on defense, is matched up with a battle opponent in a battle game and is attacked by the battle opponent, then if the user wins the battle game with all of the opponent offensive player objects EOb of the battle opponent disappearing from the game field, the rate parameter of the user, who is on defense and is a winner, is not changed. When the user, on defense, is matched up with a battle opponent in a battle game and is attacked by the battle opponent, then if at least one of the own defensive player objects DOb remains at the time that the predetermined number of turns is reached, the user, on defense, wins and the rate parameter of the user, who is on defense and is a winner, is not changed. Thus, when the user, on defense, fights against a battle opponent, then the rate parameter possessed by the user is not changed if the user wins the battle, and is decreased if the user loses the battle. The more the number of opponent offensive player objects EOb remaining at the time of loss is, the more the rate parameter is decreased.

Thus, in the above battle game, the score (rate parameter) of the user, not only on offense but also on defense, is changed, depending on the result of a battle, and therefore, it is necessary to make a game plan in terms of not only the deposition of offensive objects but also the deposition of defensive objects. Note that the increase and decrease in the rate parameter may be changed, depending on the number of times a battle is performed, taking into consideration the balance between offense and defense. For instance, in the case of the non-limiting example increase and decrease in the rate parameter of FIG. 10, when the user is on defense, the rate parameter of the user themselves is only decreased. Therefore, for instance, in order to reduce the decrease of the rate parameter, the rate parameter of the user, on defense, may be changed only within a predetermined number of times a battle is performed (e.g., once) after registration of a defense map, and may not be changed in the following battles using the defense map. In another non-limiting example, when the user, on defense, wins, the rate parameter of the user may be increased, and when the user, on offense, loses, the rate parameter of the user may be decreased.

Note that when the user of the information processing apparatus 3 chooses "fight against another user" in the menu of the above battle game and is matched up with a battle opponent, then if the user desires to avoid a battle against that battle opponent, the user is allowed to give up the battle. In this case, the user does not play the battle game, but consumes a participation parameter (e.g., an energy parameter) for the battle, and loses the battle game (i.e., without a change in the rate parameter).

Concerning the above non-limiting example increase and decrease in the rate parameter in a battle, when the user is on defense, the rate parameter of the user themselves is never increased, and therefore, the user may desire to avoid being on defense. However, in this non-limiting example, the offense map area AAp that is used when the user is on offense is integrally formed with the defense map area DAe that is used with the user is on defense, during map editing. Therefore, the user is allowed to participate in a battle game on offense under the condition that not only the offense map area AAp but also the defense map area DAe are edited and registered in the server 200. As a result, the same number of defense map areas DAe on defense as users desiring to participate in a battle game are registered, and therefore, the balance between offense and defense can be maintained.

Thus, in the above battle game, the user, on offense, manually controls an offensive object according to the user's operation, and another user's defensive object on defense is automatically controlled by the control unit, so that an asynchronous battle game is achieved. The user's offensive object is used when the user themselves fights against another user, and the user's defensive object is used when the user themselves is matched up with another user's battle opponent. Therefore, the offensive and defensive objects appear in different scenes. In the asynchronous battle game thus assumed, a game map on which not only is a defensive object previously disposed on a defense map for defending against another user's attack, but also an offensive object is previously disposed on an offense map for attacking another user, is displayed on the display screen. Therefore, the user is allowed to dispose and observe objects in both offensive and defensive perspectives, and therefore, the game can be prevented from being monotonous.

Note that in the above map editing, the entire game map that includes a defensive object (an own defensive equipment object DOa and an own defensive player object DOb) which is disposed in the defense map area DAp by the user, and an offensive object (own offensive equipment object AOa) which is disposed in the offense map area AAp (and the neutral map area NAp) by the user, is displayed on the display unit 35. Alternatively, a portion of the game map may be displayed on the display unit 35 during the map editing. For instance, a defensive object that is disposed in the defense map area DAp by the user may be displayed on the display screen of the display unit 35, and an offensive object that is disposed in the offense map area AAp by the user may be located outside the display screen of the display unit 35. In that situation, the offensive object may be displayed on the display screen of the display unit 35 in response to a screen scroll operation performed by the user. Alternatively, in the case where the display unit 35 has a plurality of display screens, the game map may be divided into portions, which are displayed on the separate display screens.

In the above map editing, a defensive object (an own defensive equipment object DOa and an own defensive player object DOb) which is disposed in the defense map area DAp by the user, and an offensive object (own offensive equipment object AOa) which is disposed in the offense map area AAp (and the neutral map area NAp) by the user, may be disposed on different game maps. In FIG. 5, a defensive object and an offensive object displayed during map editing are disposed in the defense map area DAp and the offense map area AAp set on the same game map. Alternatively, for instance, the defense map area DAp and the offense map area AAp may be disposed on different game maps (e.g., the game map of FIG. 5 may be divided at the portion of the seventh row (row 7r) in the grid-pattern area). In that case, a defense game map and an offense game map that are separate game maps may be combined to form a single battle game map.

The game map used by the user in a battle against another user and the game map used in a simulated battle may be provided in any other suitable forms. For instance, an offensive object may be disposed on a game map on which a defensive object has been disposed (an offensive object is disposed and added to a combination of a defensive object and a game map). Alternatively, a defensive object may be disposed on a game map on which an offensive object has been disposed (a defensive object is disposed and added to a combination of an offensive object and a game map). Alternatively, a defensive object and an offensive object may be disposed in a game field in which none of a defensive object and an offensive object has been disposed (an offensive object and a defensive object are additionally disposed in a game field).

In the foregoing, an example has been described in which a battle game is performed using a two-dimensional game map having a plurality of areas that are arranged in a grid-pattern and in which an object possessed by the user can be disposed. Alternatively, a two-dimensional game field that has a varying height or level, e.g., undulates, may be used, or a three-dimensional game field which allows an object to be disposed in space may be used. As used herein, the game field encompasses the above two-dimensional game maps.

Next, main data used in the process performed in the information processing apparatus 3 will be described in FIG. 11. Note that FIG. 11 is a diagram showing a non-limiting example of main data and a program stored in the storage unit 32 of the information processing apparatus 3.

Figure 11:
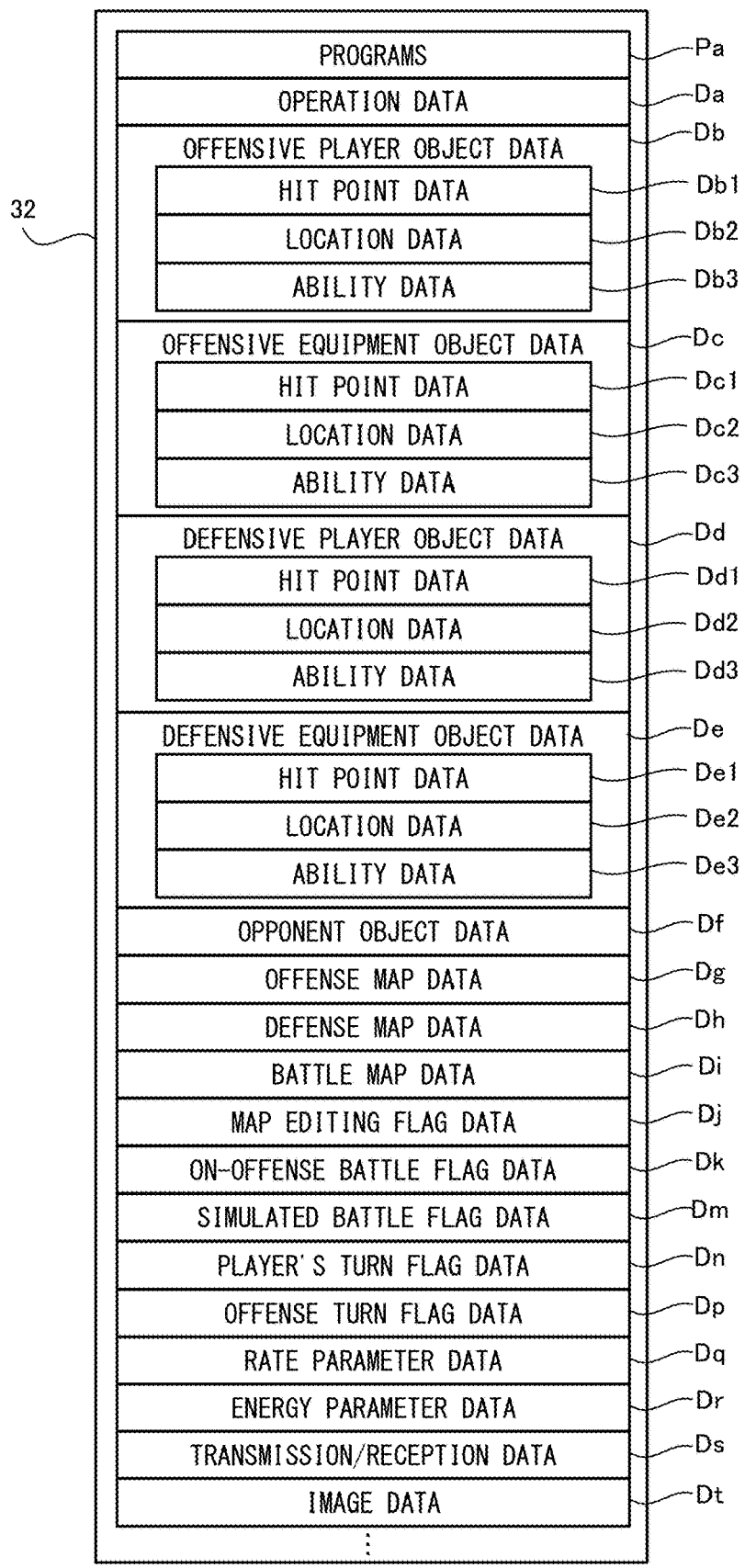
FIG. 11 is a diagram showing a non-limiting example of main data and a program stored in a storage unit 32 of the information processing apparatus 3.

As shown in FIG. 11, the storage unit 32 stores, in a data storage area, operation data Da, offensive player object data Db, offensive equipment object data Dc, defensive player object data Dd, defensive equipment object data De, opponent object data Df, offense map data Dg, defense map data Dh, battle map data Di, map editing flag data Dj, on-offense battle flag data Dk, simulated battle flag data Dm, player's turn flag data Dn, offense turn flag data Dp, rate parameter data Dq, energy parameter data Dr, transmission/reception data Ds, and image data Dt, etc. Note that the storage unit 32 stores, in addition to data included in the information of FIG. 11, data and the like used in an application that is executed, and data required in a process. In addition, the storage unit 32 stores, in a program storage area, a program group Pa including a communication program and an information processing program (game program).

The operation data Da indicates operation information about the user's operation performed on the information processing apparatus 3. For example, operation data indicating an operation performed on the input unit 34 is acquired at time intervals that are a unit process time (e.g., 1/60 sec) of the information processing apparatus 3, and the operation data Da is updated with the acquired operation data.

The offensive player object data Db includes data indicating a profile and ability value of each own offensive player object AOb disposed in the offense map area AAp (the neutral map area NAp) by the user, and data indicating states thereof on a game map (battle map), i.e. hit point data Db1, location data Db2, and ability data Db3, etc. The hit point data Db1 indicates the life parameter (hit point) of an own offensive player object AOb. The location data Db2 indicates a location where an own offensive player object AOb is disposed on a game map. The ability data Db3 indicates ability values of an own offensive player object AOb including the maximum movement distance, maximum attack distance, offensive strength, defensive strength, speed, and magic offensive power, etc.

The offensive equipment object data Dc includes data indicating a profile and ability value of each own offensive equipment object AOa disposed in the offense map area AAp by the user, and data indicating states thereof on a game map (battle map), i.e. hit point data Dc1, location data Dc2, and ability data Dc3, etc. The hit point data Dc1 indicates a withstanding parameter (hit point) possessed by an own offensive equipment object AOa. Note that for some equipment objects such as a trap object that cause damage to another object that is invading or intruding, and then disappear, the hit point data Dc1 may not be set. The location data Dc2 indicates a location where an own offensive equipment object AOa is disposed on a game map. The ability data Dc3 indicates ability values possessed by an own offensive equipment object AOa including the ability, maximum attack distance, effect range, offensive strength, offensive power, etc.

The defensive player object data Dd includes data indicating a profile and ability value of each own defensive player object DOb disposed in the defense map area DAp by the user, and data indicating states thereof on a game map (battle map), i.e. hit point data Dd1, location data Dd2, and ability data Dd3, etc. The hit point data Dd1 indicates a life parameter (hit point) possessed by an own defensive player object DOb. The location data Dd2 indicates a location where an own defensive player object DOb is disposed on a game map. The ability data Dd3 indicates ability values possessed by an own defensive player object DOb including the maximum movement distance, maximum attack distance, offensive strength, defensive strength, speed, and magic offensive power, etc.

The defensive equipment object data De includes data indicating a profile and ability value of each own defensive equipment object DOa disposed in the defense map area DAp by the user, and data indicating states thereof on a game map (battle map), i.e. hit point data De1, location data De2, and ability data De3, etc. The hit point data De1 indicates a withstanding parameter (hit point) possessed by an own defensive equipment object DOa. Note that for some equipment objects such as a trap object that cause damage to another object that is invading or intruding, and then disappear, the hit point data De1 may not be set. The location data De2 indicates a location where an own defensive equipment object DOa is disposed on a game map. The ability data De3 indicates ability values possessed by an own defensive equipment object DOa including the ability, maximum attack distance, effect range, offensive strength, offensive power, etc.

The opponent object data Df indicates a profile and ability value of each opponent defensive equipment object EOc and each opponent defensive player object EOd disposed in the defense map area DAe by another user as a battle opponent, and a profile and ability value of each opponent offensive equipment object EOa and each opponent offensive player object EOb disposed in the offense map area AAe by another user as a battle opponent, and data indicating states thereof on a game map (battle map). The opponent object data Df includes hit point data, location data, and ability data, etc., of each object as a battle opponent.

The offense map data Dg indicates the offense map area AAp produced by the user and the offense map area AAe produced by another user as a battle opponent. The defense map data Dh indicates the defense map area DAp produced by the user and the defense map area DAe produced by another user as a battle opponent. The battle map data Di indicates game maps (battle maps) used in a battle against another user and a simulated battle.

The map editing flag data Dj indicates a map editing flag that is set "on" when the user performs map editing. The on-offense battle flag data Dk indicates an on-offense battle flag that is set "on" when a game is performed in which the user, on offense, fights against another user as a battle opponent. The simulated battle flag data Dm indicates a simulated battle flag that is set "on" when the user performs a simulated battle. The player's turn flag data Dn indicates a player's turn flag that is set "on" when the user is in the player's turn in a battle game against another user. The offense turn flag data Dp indicates an offense turn flag that is set "on" when the user is in the player's turn in a simulated battle.

The rate parameter data Dq indicates a rate parameter possessed by the user. The energy parameter data Dr indicates an energy parameter (participation parameter) possessed by the user.

The transmission/reception data Ds includes data that is received from another apparatus (e.g., the server 200) or data that is transmitted to another apparatus.

The image data Dt is for displaying an image on a display screen in a game.

Figure 12:
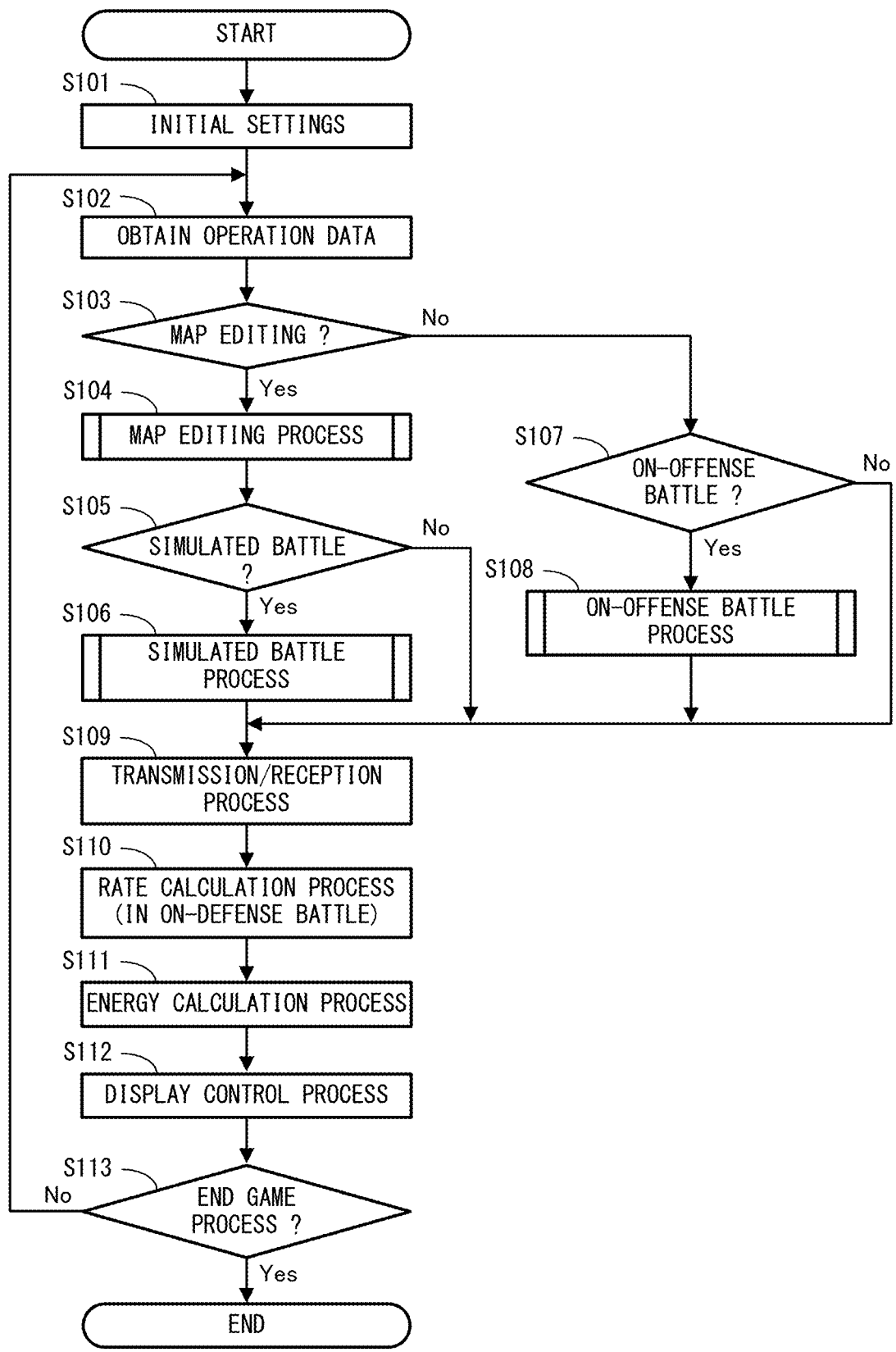
FIG. 12 is a flowchart showing a non-limiting example of a process executed in the information processing apparatus 3.
Figure 13:
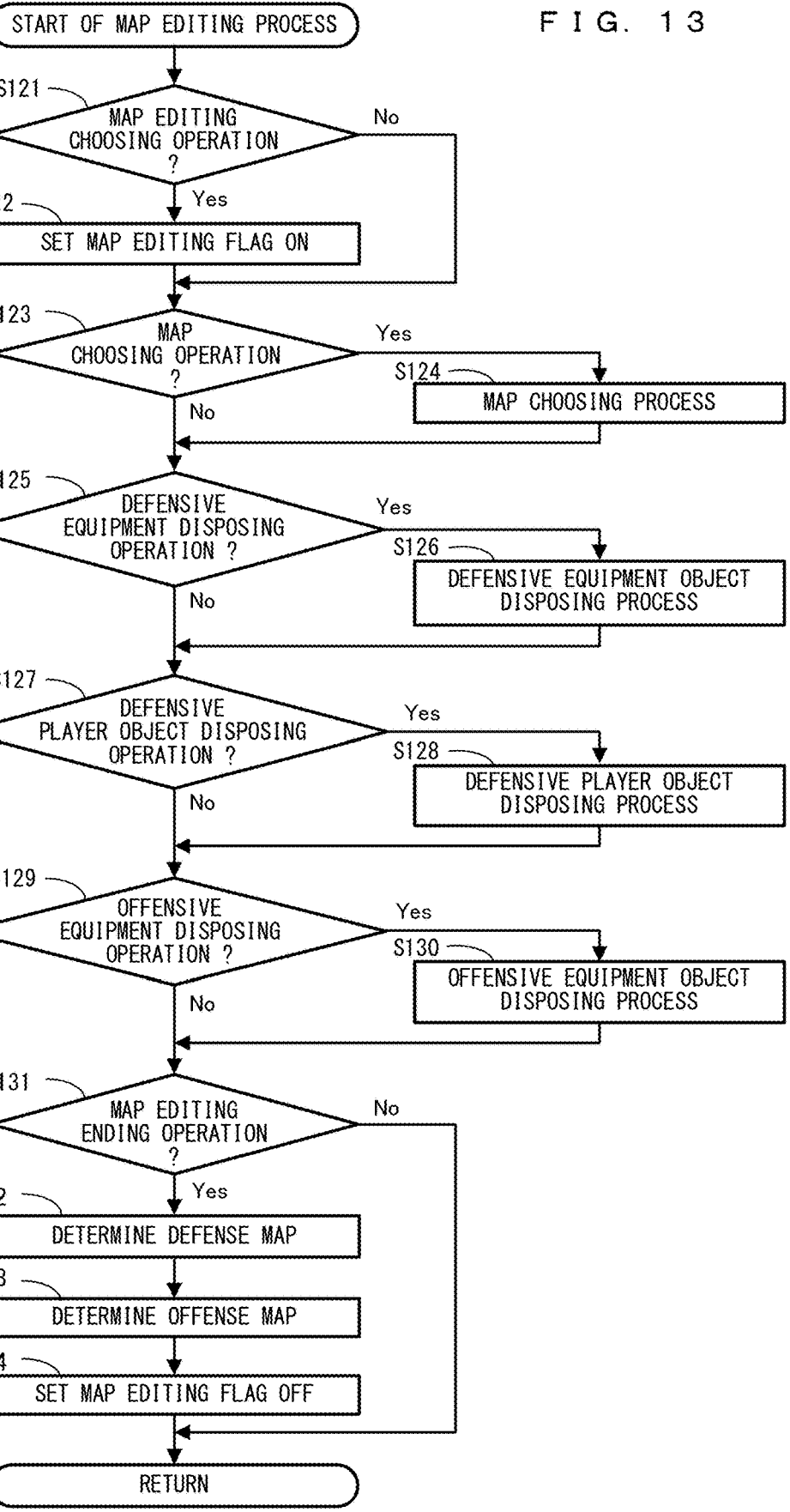
FIG. 13 is a subroutine indicating a non-limiting example of details of a map editing process in step S104 shown in FIG. 12.
Figure 14:
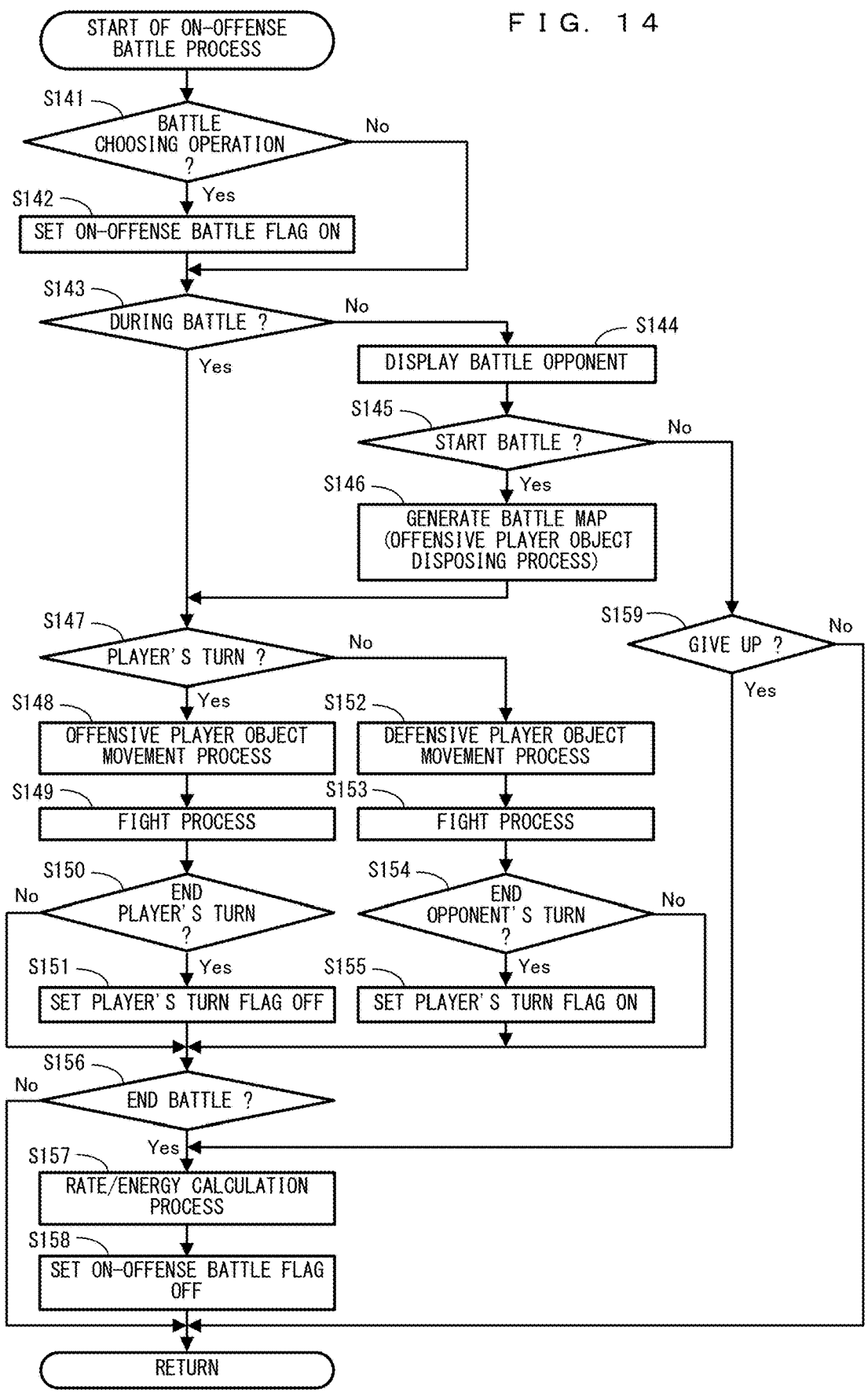
FIG. 14 is a subroutine showing a non-limiting example of details of an on-offense battle process in step S108 shown in FIG. 12.
Figure 15:
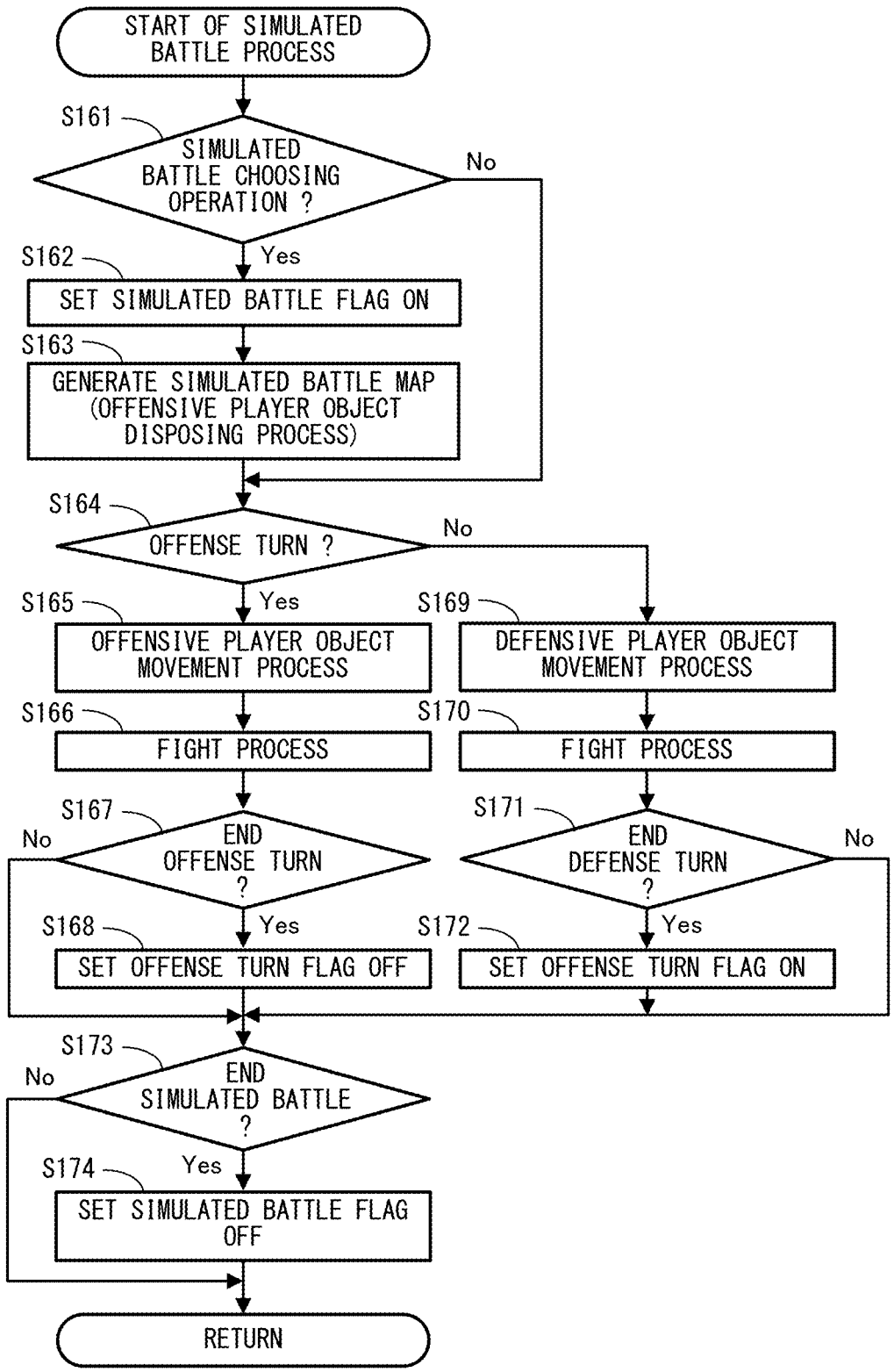
FIG. 15 is a subroutine showing a non-limiting example of details of a simulated battle process in step S106 shown in FIG. 12.

Next, a process performed in the information processing apparatus 3 will be described in detail with reference to FIGS. 12-15. Note that FIG. 12 is a flowchart showing a non-limiting example of the process executed in the information processing apparatus 3. FIG. 13 is a subroutine indicating a non-limiting example of details of a map editing process in step S104 shown in FIG. 12. FIG. 14 is a subroutine showing a non-limiting example of details of an on-offense battle process in step S108 shown in FIG. 12. FIG. 15 is a subroutine showing a non-limiting example of details of a simulated battle process in step S106 shown in FIG. 12. Here, in the flowcharts of FIGS. 12-15, of the processes performed in the information processing system 1, game processes performed in the information processing apparatus 3 will be mainly described, and other processes that are not directly related to the game processes will not be described. In FIGS. 12-15, each step executed by the control unit 31 is abbreviated to "S."

In this non-limiting example, the series of processes of FIGS. 12-15 is performed by the control unit 31 (CPU) executing a game program stored in the program storage unit 33. Note that the processes of FIGS. 12-15 are started with any suitable timing. In this case, all or a portion of the game program is loaded into the storage unit 32 with appropriate timing and is executed by the control unit 31. As a result, the series of processes of FIGS. 12-15 is started. Note that it is assumed that the game program is previously stored in the program storage unit 33. Note that in another non-limiting example, the game program may be obtained from a storage medium removably attached to the information processing apparatus 3 and stored into the storage unit 32, or may be obtained from another apparatus through a network, such as the Internet, and stored into the storage unit 32.

The steps of the flowcharts of FIGS. 12-15 are merely illustrative, and if a similar result is obtained, the order in which the steps are performed may be changed, and another step may be executed in addition to and/or instead of each step. Although in this non-limiting example embodiment, it is assumed that each step of the flowcharts is executed by the control unit 31, all or a portion of the steps of the flowcharts may be executed by a processor other than the CPU of the control unit 31 or a dedicated circuit.

In FIG. 12, the control unit 31 sets initial settings (step S101), and control proceeds to the next step. For example, the control unit 31 initially sets parameters for use in the subsequent steps.

Next, the control unit 31 acquires operation data from the input unit 34 and updates the operation data Da (step S102), and control proceeds to the next step.

Next, the control unit 31 determines whether or not to perform map editing (step S103). For instance, when the control unit 31 determines, with reference to the operation data Da, that an operation of choosing "map editing" in a game menu has been performed, or that the map editing flag indicated by the map editing flag data Dj is "on," the result of the determination by the control unit 31 in step S103 is positive. When the control unit 31 determines to perform map editing, control proceeds to step S104. Otherwise, i.e. when the control unit 31 determines not to perform map editing, control proceeds to step S107.

In step S104, the control unit 31 performs a map editing process, and control proceeds to the next step. A non-limiting example of the map editing process performed in step S104 will now be described with reference to FIG. 13.

In FIG. 13, the control unit 31 determines whether or not an operation of choosing "map editing" has currently been performed (step S121). For instance, if the operation data Da indicates an operation of choosing "map editing" in the game menu, the result of the determination by the control unit 31 in step S121 is positive. When the control unit 31 determines that an operation of choosing "map editing" has currently been performed, control proceeds to step S122. Otherwise, i.e. when the control unit 31 determines that an operation of choosing "map editing" has not currently been performed, control proceeds to step S123.

In step S122, the control unit 31 sets the map editing flag "on" and updates the map editing flag data Dj, and control proceeds to step S123.

In step S123, the control unit 31 determines whether or not an operation of choosing a game map has been performed. For instance, when the operation data Da indicates an operation of choosing a game map, the result of the determination by the control unit 31 in step S123 is positive. When the control unit 31 determines that an operation of choosing a game map has been performed, control proceeds to step S124. Otherwise, i.e. when the control unit 31 determines that an operation of choosing a game map has not been performed, control proceeds to step S125.

In step S124, the control unit 31 performs a process of choosing a game map according to the user's operation, and control proceeds to step S125. For instance, the control unit 31 performs a process of choosing a game map for use in a battle from a plurality of kinds of previously prepared terrains, according to the operation data Da. Thereafter, the control unit 31 updates the offense map data Dg with a portion of the chosen game map corresponding to the offense map area AAp (and the neutral map area NAp). The control unit 31 also updates the defense map data Dh with a portion of the chosen game map corresponding to the defense map area DAp.

In step S125, the control unit 31 determines whether or not an operation of disposing a defensive equipment object has been performed. For instance, if the operation data Da indicates an operation of disposing a defensive equipment object, the result of the determination by the control unit 31 in step S125 is positive. When the control unit 31 determines that an operation of disposing a defensive equipment object has been performed, control proceeds to step S126. Otherwise, i.e. when the control unit 31 determines that an operation of disposing a defensive equipment object has not been performed, control proceeds to step S127.

In step S126, the control unit 31 performs a process of disposing a defensive equipment object in a defense map area according to the user's operation, and control proceeds to step S127. For instance, the control unit 31 performs a process of disposing, as an own defensive equipment object DOa, an equipment object that has been chosen by the user as an object to be disposed, in the defense map area DAp indicated by the defense map data Dh, according to the user's operation, with reference to the operation data Da and the defense map data Dh (see FIG. 5). Thereafter, the control unit 31 updates the defensive equipment object data De, based on the type and location of the own defensive equipment object DOa disposed in the defense map area DAp.

In step S127, the control unit 31 determines whether or not an operation of disposing a defensive player object has been performed. For instance, if the operation data Da indicates an operation of disposing a defensive player object, the result of the determination by the control unit 31 in step S127 is positive. When the control unit 31 determines that an operation of disposing a defensive player object has been performed, control proceeds to step S128. Otherwise, i.e. when the control unit 31 determines that an operation of disposing a defensive player object has not been performed, control proceeds to step S129.

In step S128, the control unit 31 performs a process of disposing a defensive player object in a defense map area according to the user's operation, and control proceeds to step S129. For instance, the control unit 31 performs a process of disposing, as an own defensive player object DOb, a player object chosen by the user as an object to be disposed, in the defense map area DAp indicated by the defense map data Dh, according to the user's operation, with reference to the operation data Da and the defense map data Dh (see FIG. 5). Thereafter, the control unit 31 updates the defensive player object data Dd, based on the type and location of the own defensive player object DOb disposed in the defense map area DAp.

In step S129, the control unit 31 determines whether or not an operation of disposing an offensive equipment object has been performed. For instance, if the operation data Da indicates an operation of disposing an offensive equipment object, the result of the determination by the control unit 31 in step S129 is positive. When the control unit 31 determines that an operation of disposing an offensive equipment object has been performed, control proceeds to step S130. Otherwise, i.e. when the control unit 31 determines that an operation of disposing an offensive equipment object has not been performed, control proceeds to step S131.

In step S130, the control unit 31 performs a process of disposing an offensive equipment object in an offense map area according to the user's operation, and control proceeds to step S131. For instance, the control unit 31 performs a process of disposing, as an own offensive equipment object AOa, an equipment object chosen by the user as an object to be disposed, in the offense map area AAp indicated by the offense map data Dg, according to the user's operation, with reference to the operation data Da and the offense map data Dg (see FIG. 5). Thereafter, the control unit 31 updates the offensive equipment object data Dc, based on the type and location of the own offensive equipment object AOa disposed in the offense map area AAp.

In step S131, the control unit 31 determines, with reference to the operation data Da, whether or not an operation of ending map editing has been performed. When the control unit 31 determines that an operation of ending map editing has been performed, control proceeds to step S132. Otherwise, i.e. when the control unit 31 determines that an operation of ending map editing has not been performed, the control unit 31 ends the subroutine.

In step S132, the control unit 31 performs a process of determining a defense map by map editing, and control proceeds to the next step. For instance, the control unit 31 generates a defense map area DAp in which an own defensive equipment object DOa and an own defensive player object DOb are disposed, based on the defensive player object data Dd, the defensive equipment object data De, and the defense map data Dh, and updates the defense map data Dh with the generated defense map area DAp. The control unit 31 also writes the defense map data Dh, as transmission data to be transmitted to the server 200, into the transmission/reception data Ds, in order to register the user's defense map indicated by the defense map data Dh into the server 200.

Next, the control unit 31 performs a process of determining an offense map by map editing, and control proceeds to the next step. For instance, the control unit 31 generates an offense map area AAp in which an own offensive equipment object AOa is disposed, based on the offensive equipment object data Dc and the offense map data Dg, and updates the offense map data Dg with the generated offense map area AAp.

Next, the control unit 31 sets the map editing flag "off" and updates the map editing flag data Dj, and ends the subroutine.

Referring back to FIG. 12, after the map editing process in step S104, the control unit 31 determines whether or not to perform a simulated battle (step S105). For instance, when the control unit 31 determines, with reference to the operation data Da, that an operation of choosing "simulated battle" on the map editing screen has been performed, or when the simulated battle flag indicated by the simulated battle flag data Dm is "on," the result of the determination by the control unit 31 in step S105 is positive. When the control unit 31 determines to perform a simulated battle, the control unit 31 performs a simulated battle process of step S106, and thereafter, control proceeds to step S109. Otherwise, i.e. when the control unit 31 determines not to perform a simulated battle, control proceeds to step S109.

When in step S103 the control unit 31 determines not to perform map editing, the control unit 31 determines whether or not to perform a battle on offense (step S107). For instance, when the control unit 31 determines, with reference to the operation data Da, that an operation of choosing "fight against another user" in the game menu has been performed, or when the on-offense battle flag indicated by the on-offense battle flag data Dk is "on," the result of the determination by the control unit 31 in step S107 is positive. When the control unit 31 determines to perform a battle on offense, control proceeds to step S108. Otherwise, i.e. when the control unit 31 determines not to perform a battle on offense, control proceeds to step S109. Note that if the numerical value of the energy parameter indicated by the energy parameter data Dr is smaller than the numerical value required for participation in an on-offense battle, the game menu may be displayed on the display unit 35 with the option "fight against another user" in the game menu not allowed to be chosen (e.g., that option is not displayed).

In step S108, the control unit 31 performs an on-offense battle process, and control proceeds to step S109. A non-limiting example of the on-offense battle process performed in step S108 will not be described with reference to FIG. 14.

In FIG. 14, the control unit 31 determines whether or not an operation of choosing "fight against another user" has currently been performed (step S141). For instance, if the operation data Da indicates an operation of choosing "fight against another user" in the game menu, the result of the determination by the control unit 31 in step S141 is positive. When the control unit 31 determines that an operation of choosing "fight against another user" has currently been performed, control proceeds to step S142. Otherwise, i.e. when the control unit 31 determines that an operation of choosing "fight against another user" has not currently been performed, control proceeds to step S143.

In step S142, the control unit 31 sets the on-offense battle flag "on" and updates the on-offense battle flag data Dk, and control proceeds to step S143. The control unit 31 also writes a battle request, as transmission data to be transmitted to the server 200, into the transmission/reception data Ds in order to request the server 200 to match up with a battle opponent.

In step S143, the control unit 31 determines whether or not a game is being played in which the user, on offense, fights against a battle opponent. When the control unit 31 determines that a game for fighting against a battle opponent is not being played, i.e. when a game for fighting against a battle opponent has not yet been started, control proceeds to step S144. Otherwise, i.e. when the control unit 31 determines that a game for fighting against a battle opponent is being played, control proceeds to step S147.

In step S144, the control unit 31 displays a battle opponent and prompts the user to perform an operation of starting a battle against the battle opponent, and control proceeds to the next step. For instance, the control unit 31 displays a battle opponent on the display unit 35, based on battle opponent data that is transmitted by the server 200 after performing matching-up in response to a battle request transmitted to the server 200. The control unit 31 also subtracts the numerical value of the energy parameter (participation parameter) required for a battle against the battle opponent from the numerical value of the energy parameter indicated by the energy parameter data Dr, and updates the energy parameter data Dr with the numerical value of the energy parameter resulting from the subtraction. Note that the numerical value that is subtracted may be calculated based on the user's assessment value (rate parameter), and for instance, may be increased with an increase in the user's assessment value. The battle opponent data transmitted by the server 200 may also include data indicating a defense map area DAe produced by another user as a battle opponent performing map editing. When the control unit 31 displays a battle opponent, the control unit 31 may display the defense map area DAe of the battle opponent on the display unit 35.

Next, the control unit 31 determines whether or not an operation of starting a battle against the displayed battle opponent has been performed (step S145). For instance, if the operation data Da indicates an operation of starting a battle, the result of the determination by the control unit 31 in step S145 is positive. When the control unit 31 determines that an operation of starting a battle has been performed, control proceeds to step S146. Otherwise, i.e. when the control unit 31 determines that an operation of starting a battle has not been performed, control proceeds to step S159.

In step S146, the control unit 31 performs a process of generating a game map for a battle, and control proceeds to step S147. For instance, the control unit 31 combines an offense map area AAp indicated by the offense map data Dg with the battle opponent's defense map area DAe indicated by the battle opponent data received from the server 200, into a single game map for a battle, and updates the battle map data Di with the game map. The control unit 31 also disposes a player object possessed by the user as an own offensive player object AOb in the neutral map area NAp of the game map for a battle, and updates the offensive equipment object data Dc with the type and location of the own offensive player object AOb disposed on the game map for a battle (see FIG. 6). Note that own offensive player objects AOb may be sequentially disposed on the game map for a battle according to the user's operation, or player objects previously set by the user may be disposed at previously set locations. In the former case, the control unit 31 may repeatedly perform step S146 until the disposition of own offensive player objects AOb on the game map for a battle has been completed.

In step S147, the control unit 31 determines whether or not the current turn is the player's turn in a game in which the user, on offense, fights against a battle opponent. For instance, if the player's turn flag indicated by the player's turn flag data Dn is "on," the result of the determination by the control unit 31 in step S147 is positive. When the control unit 31 determines that the current turn is the player's turn, control proceeds to step S148. Otherwise, i.e. when the control unit 31 determines that the current turn is the opponent's turn, control proceeds to step S152.

In step S148, the control unit 31 performs an offensive player object movement process, and control proceeds to the next step. For instance, the control unit 31 moves an own offensive player object AOb disposed on the game map for a battle according to the user's operation. Specifically, when the control unit 31 determines, with reference to the operation data Da, that an operation of moving one of own offensive player objects AOb as an object to be operated, on the game map for a battle, has been performed, the control unit 31 moves the location of the own offensive player object AOb according to the operation, and updates the location data Db2 of the own offensive player object AOb with the location after the movement. Note that a movement amount, movement speed, and movement range of an own offensive player object AOb are controlled based on movement characteristics of the own offensive player object AOb in the ability data Db3.

Next, the control unit 31 performs a fight process between an offensive object and a defensive object (step S149), and control proceeds to the next step. For instance, when the control unit 31 determines that the user has performed an operation of attacking the battle opponent's defensive object, the control unit 31 performs a process of causing an own offensive player object AOb and the battle opponent's defensive object to fight against each other according to the operation, and updates the hit point data Db1 of the own offensive player object AOb and the hit point data of the defensive object. In the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. Note that in the fight process of step S149, the ability and maximum attack distance of an own offensive player object AOb during a fight against a defensive object are set based on the ability data Db3 of the own offensive player object AOb.

In step S149, the control unit 31 may perform a fight process between an own offensive equipment object AOa and a defensive object. For instance, if the current time is a timing that an effect of an own offensive equipment object AOa occurs (e.g., at the start or end of the player's turn), the control unit 31 performs a process of causing the own offensive equipment object AOa and the battle opponent's defensive object to fight against each other, and updates the hit point data Dc1 of the own offensive equipment object AOa and the hit point data of the defensive object. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. Note that in the fight process of step S149, the ability and maximum attack distance of an own offensive equipment object AOa during a fight against a defensive object are set based on the ability data Dc3 of the own offensive equipment object AOa.

Next, the control unit 31 determines whether or not the player's turn has ended (step S150). For instance, if all own offensive player objects AOb disposed on the game map for a battle have ended their actions or when the operation data Da indicates that the user has performed a predetermined operation (an operation of choosing an operation button for instructing to end the turn), the result of the determination by the control unit 31 in step S150 is positive. When the control unit 31 determines that the player's turn has ended, control proceeds to step S151. Otherwise, i.e. when the control unit 31 determines that the player's turn has not ended, control proceeds to step S156.

In step S151, the control unit 31 sets the player's turn flag "off" and updates the player's turn flag data Dn, and control proceeds to step S156.

Meanwhile, when in step S147 the control unit 31 determines that the current turn is the opponent's turn, the control unit 31 performs a defensive player object movement process (step S152), and control proceeds to the next step. For instance, the control unit 31 moves an opponent defensive player object EOd disposed on the game map for a battle according to a predetermined algorithm. Specifically, the control unit 31 moves one of opponent defensive player objects EOd as an object to be moved, on the game map for a battle, and updates the opponent object data Df (location data) of that opponent defensive player object EOd using the location after the movement. Note that a movement amount, movement speed, and movement range of an opponent defensive player object EOd are controlled based on movement characteristics of the opponent defensive player object EOd in the opponent object data Df (ability data).

Next, the control unit 31 performs a fight process between the battle opponent's defensive object and the user's offensive object (step S153), and control proceeds to the next step. For instance, when an opponent defensive player object EOd attacks the user's own offensive player object AOb, the control unit 31 performs a process of causing the opponent defensive player object EOd and the own offensive player object AOb to fight against each other, and updates the hit point data of the opponent defensive player object EOd and the hit point data Db1 of the own offensive player object AOb. In the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. When an opponent defensive player object EOd attacks the user's own offensive equipment object AOa, the control unit 31 performs a process of causing the opponent defensive player object EOd to attack the own offensive equipment object AOa, and updates the hit point data Dc1 of the own offensive equipment object AOa. Also in the process of attacking the own offensive equipment object AOa, an image in which the opponent defensive player object EOd attacks the own offensive equipment object AOa is generated, and the amount of damage to the own offensive equipment object AOa is determined based on the ability of the opponent defensive player object EOd and the withstanding ability of the own offensive equipment object AOa, etc., and a hit point corresponding to the damage is subtracted to update the hit point data Dc1 of the own offensive equipment object AOa, an own offensive equipment object AOa whose resultant hit point is zero is destroyed and made ineffective on the game map for a battle. Note that in the fight process of step S128, the ability and maximum attack distance of an opponent defensive player object EOd in a fight against an own offensive player object AOb and an attack on an own offensive equipment object AOa are set based on the opponent object data Df (ability data) of the opponent defensive player object EOd.

In step S153, the control unit 31 may also perform a fight process between the battle opponent's opponent defensive equipment object EOc and the user's offensive object. For instance, when the current time is a timing that an effect of an opponent defensive equipment object EOc occurs (e.g., at the start or end of the opponent's turn), a process of causing the opponent defensive equipment object EOc and the user's offensive object to fight against each other is performed, and the hit point data of the opponent defensive equipment object EOc and the hit point data Db1 or Dc1 of the offensive object are updated. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a battle. Note that in the fight process of step S153, the ability and maximum attack distance of an opponent defensive equipment object EOc in a fight against an offensive object are set based on the opponent object data Df (ability data) of the opponent defensive equipment object EOc.

Next, the control unit 31 determines whether or not the opponent's turn has ended (step S154). For instance, when all opponent defensive player objects EOd disposed on the game map for a battle has ended their actions, the result of the determination by the control unit 31 in step S154 is positive. When the control unit 31 determines that the opponent's turn has ended, control proceeds to step S155. Otherwise, i.e. when the control unit 31 determines that the opponent's turn has not ended, control proceeds to step S156.

In step S155, the control unit 31 sets the player's turn flag "on" and updates the player's turn flag data Dn, control proceeds to step S156.

In step S156, the control unit 31 whether or not to end the game in which the user, on offense, fights against the battle opponent. A battle game is ended under, for instance, the condition that the condition for ending the battle game is satisfied (e.g., the maximum number of turns set for the battle game has been reached, all own offensive player objects AOb or all opponent defensive player objects EOd have been defeated or destroyed, etc.), the condition that the user has performed an operation of ending the battle game, etc. When the control unit 31 determines not to end the battle game, the control unit 31 ends the subroutine. When the control unit 31 determines to end the battle game, control proceeds to step S157.

In step S157, the control unit 31 performs a rate/energy calculation process, and control proceeds to the next step. For instance, the control unit 31 calculates the numerical value of the rate parameter that is added or subtracted to or from the user, depending on the number of offensive and/or defensive objects remaining on the game map for a battle at the end of the game, and updates the rate parameter data Dq based on the calculated numerical value. For instance, in the case where the rate increase/decrease condition illustrated in FIG. 9 is used, the user, on offense, can acquire a rate point corresponding to the number of own offensive player objects AOb remaining on the game map for a battle at the end of the game only if the user has won the battle game. In addition, when the battle opponent's building object which gives a bonus to the user (i.e., an opponent defensive equipment object EOc that gives a bonus) is destroyed by the user's offensive object in a battle game, the control unit 31 calculates the numerical value of an energy parameter (participation parameter) added to the user, depending on the destroyed defensive object, and updates the energy parameter data Dr with the calculated numerical value. For instance, the numerical value of an energy parameter (participation parameter) added to the user, depending on the destroyed defensive object, may be calculated based on the assessment value (rate parameter) of the user. For instance, the higher the assessment value is, the greater the added numerical value is.

Next, the control unit 31 sets the on-offense battle flag "off" and updates the on-offense battle flag data Dk, and ends the subroutine. The control unit 31 also writes the result of the battle against the battle opponent, as transmission data to be transmitted to the server 200, into the transmission/reception data Ds in order to notify the server 200 of the battle result.

When in step S145 the control unit 31 determines not to start a battle, the control unit 31 determines whether or not to give up a battle against the displayed battle opponent (step S159). For instance, if the operation data Da indicates an operation of giving up, the result of the determination by the control unit 31 in step S159 is positive. When the control unit 31 determines that an operation of giving up has been performed, control proceeds to step S157. Otherwise, i.e. when the control unit 31 determines that an operation of giving up has not been performed, the control unit 31 ends the subroutine.

Next, a non-limiting example of the simulated battle process performed in step S106 will be described with reference to FIG. 15.

In FIG. 15, the control unit 31 determines whether or not an operation of choosing "simulated battle" has currently been performed (step S161). For instance, if the operation data Da indicates an operation of choosing "simulated battle" on the map editing screen, the result of the determination by the control unit 31 in step S161 is positive. When the control unit 31 determines that an operation of choosing "simulated battle" has currently been performed, control proceeds to step S162. Otherwise, i.e. when the control unit 31 determines that an operation of choosing "simulated battle" has not currently been performed, control proceeds to step S164.

In step S162, the control unit 31 sets the simulated battle flag "on" and updates the simulated battle flag data Dm, and control proceeds to the next step.

Next, the control unit 31 performs a process of generating a game map for a simulated battle (step S163), and control proceeds to step S164. For instance, the control unit 31 combines an offense map area AAp of the user themselves indicated by the offense map data Dg with a defense map area DAp of the user themselves indicated by the defense map data Dh, into a single game map for a simulated battle, and updates the battle map data Di with the game map. The control unit 31 also disposes a player object possessed by the user as an own offensive player object AOb in the neutral map area NAp of the game map for a simulated battle, and updates the offensive equipment object data Dc with the type and location of the own offensive player object AOb disposed on the game map for a simulated battle (see FIG. 8). Note that own offensive player objects AOb disposed on the game map for a simulated battle may be sequentially disposed on the game map for a simulated battle according to the user's operation, or player objects which are previously set by the user may be disposed at previously set locations. In the former case, the control unit 31 may repeatedly perform step S163 until the disposition of own offensive player objects AOb on the game map for a simulated battle has been completed.

In step S164, the control unit 31 determines whether or not the current turn is a turn on offense (offense turn) in the simulated battle in which the user's objects (a defensive object provided by the user performing map editing, and an offensive object provided by the user performing map editing) fight against each other. For instance, if the offense turn flag indicating the offense turn flag data Dp is "on," the result of the determination by the control unit 31 in step S164 is positive. When the control unit 31 determines that the current turn is the offense turn, control proceeds to step S165. Otherwise, i.e. when the control unit 31 determines that the current turn is a turn on defense (defense turn), control proceeds to step S169.

In step S165, the control unit 31 performs an offensive player object movement process, and control proceeds to the next step. For instance, the control unit 31 moves an own offensive player object AOb disposed on the game map for a simulated battle according to the user's operation. Specifically, when the control unit 31 determines, with reference to the operation data Da, that an operation of moving one of own offensive player objects AOb as an object to be operated, on the game map for a simulated battle, has been performed, the control unit 31 moves the location of that own offensive player object AOb according to that operation, and updates the location data Db2 of the own offensive player object AOb with the location after the movement. Note that the movement amount, movement speed, and movement range of an own offensive player object AOb are controlled based on movement characteristics of the own offensive player object AOb in the ability data Db3.

Next, the control unit 31 performs a fight process between an offensive object and a defensive object (step S166), and control proceeds to the next step. For instance, when the control unit 31 determines that the user has performed an operation of attacking a defensive object of the user themselves, the control unit 31 performs a process of causing the own offensive player object AOb and the defensive object of the user themselves (i.e., an own defensive equipment object DOa and an own defensive player object DOb) to fight against each other according to the operation, and updates the hit point data Db1 of the own offensive player object AOb and the hit point data Dd1 or De1 of the defensive object. In the fight process, an image indicating that both of the objects fight against each other is generated, and the amount of damage or win/loss is determined based on the abilities, etc., of both of the objects, a hit point corresponding to the damage is subtracted to update the hit point data Db1, Dd1, and De1, and an object whose resultant hit point is zero is deleted (retreated) from the game map for a battle. Note that in the fight process of step S166, the ability and maximum attack distance of an own offensive player object AOb in a fight against an defensive object are set based on the ability data Db3 of the own offensive player object AOb.

In step S166, the control unit 31 may perform a fight process between an own offensive equipment object AOa of the user themselves and a defensive object of the user themselves. For instance, if the current time is a timing that an effect of the own offensive equipment object AOa occurs (e.g., at the start or end of an offense turn), the control unit 31 performs a process of causing the own offensive equipment object AOa and the defensive object of the user themselves (i.e., an own defensive equipment object DOa and an own defensive player object DOb) to fight against each other, and updates the hit point data Dc1 of the own offensive equipment object AOa and the hit point data Dd1 or De1 of the defensive object. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a simulated battle. Note that in the fight process of step S166, the ability and maximum attack distance of an own offensive equipment object AOa in a fight against an defensive object are set based on the ability data Dc3 of the own offensive equipment object AOa.

Next, the control unit 31 determines whether or not the offense turn has ended (step S167). For instance, when all own offensive player objects AOb disposed on the game map for a simulated battle have ended their actions or when the operation data Da indicates that the user has performed a predetermined operation (an operation of choosing an operation button for instructing to end the turn), the result of the determination by the control unit 31 in step S167 is positive. When the control unit 31 determines that the offense turn has ended, control proceeds to step S168. Otherwise, i.e. when the control unit 31 determines that the offense turn has not ended, control proceeds to step S173.

In step S168, the control unit 31 sets the offense turn flag "off" and updates the offense turn flag data Dp, and control proceeds to step S173.

Meanwhile, when in step S164 the control unit 31 determines that the current turn is the defense turn, the control unit 31 performs a defensive player object movement process (step S169), and control proceeds to the next step. For instance, the control unit 31 moves an own defensive player object DOb disposed on the game map for a simulated battle according to a predetermined algorithm. Specifically, the control unit 31 moves one of own defensive player objects DOb, as an object to be moved, on the game map for a simulated battle, and updates the location data Dd2 of the own defensive player object DOb with the location after the movement. Note that the movement amount, movement speed, and movement range of an own defensive player object DOb are controlled based on movement characteristics of the own defensive player object DOb in the ability data Dd3.

Next, the control unit 31 performs a fight process between a defensive object of the user themselves and an offensive object of the user themselves (step S170), and control proceeds to the next step. For instance, when an own defensive player object DOb fights against an own offensive player object AOb of the user themselves, the control unit 31 performs a process of causing the own defensive player object DOb and the own offensive player object AOb to fight against each other, and updates the hit point data Dd1 of the own defensive player object DOb and the hit point data Db1 of the own offensive player object AOb. In the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a simulated battle. In addition, when an own defensive player object DOb attacks an own offensive equipment object AOa of the user themselves, the control unit 31 performs a process of causing the own defensive player object DOb to attack the own offensive equipment object AOa, and updates the hit point data Dc1 of the own offensive equipment object AOa. Also in the process of attacking the own offensive equipment object AOa, an image in which the own defensive player object DOb attacks the own offensive equipment object AOa is generated, and the amount of damage to the own offensive equipment object AOa is determined based on the ability of the own defensive player object DOb and the withstanding ability of the own offensive equipment object AOa, a hit point corresponding to the damage is subtracted to update the hit point data Dc1 of the own offensive equipment object AOa, and if the resultant hit point is zero, the own offensive equipment object AOa is destroyed and made ineffective on the game map for a simulated battle. Note that in the fight process of step S170, the ability and maximum attack distance of an own defensive player object DOb when fighting against an own offensive player object AOb or attacking an own offensive equipment object AOa are set based on the ability data Dd3 of the own defensive player object DOb.

In step S170, the control unit 31 may perform a fight process between an own defensive equipment object DOa of the user themselves and an offensive object of the user themselves. For instance, if the current time is a timing that an effect of the own defensive equipment object DOa occurs (e.g., at the start or end of a defense turn), the control unit 31 performs a process of causing the own defensive equipment object DOa and the offensive object of the user themselves to fight against each other, and updates the hit point data De1 of the own defensive equipment object DOa and the hit point data Db1 or Dc1 of the offensive object. Also in the fight process, an image indicating that both of the objects fight against each other is generated, and the amount of damage or win/loss is determined based on the abilities, etc., of both of the objects, a hit point corresponding to the damage is subtracted to update the hit point data, and an object whose resultant hit point is zero is deleted (retreated) from the game map for a simulated battle. Note that in the fight process of step S170, the ability and maximum attack distance of an own defensive equipment object DOa when fighting against an offensive object are set based on the ability data De3 of the own defensive equipment object DOa.

Next, the control unit 31 determines that the defense turn has ended (step S171). For instance, when all own defensive player object DOb disposed on the game map for a simulated battle have ended their actions, the result of the determination by the control unit 31 in step S171 is positive. When the control unit 31 determines that the defense turn has ended, control proceeds to step S172. Otherwise, i.e. when the control unit 31 determines that the defense turn has not ended, control proceeds to step S173.

In step S172, the control unit 31 sets the offense turn flag "on" and updates the offense turn flag data Dp, and control proceeds to step S173.

In step S173, the control unit 31 determines whether or not to end the simulated battle in which the user's objects fight against each other. A battle game is ended under, for instance, the condition that the condition for ending the simulated battle is satisfied (e.g., the maximum number of turns set for the simulated battle has been reached, all own offensive player objects AOb or all own defensive player objects DOb have been defeated or destroyed, etc.), the condition that the user has performed an operation of ending the simulated battle, etc. When the control unit 31 determines not to end the simulated battle, the control units 31 ends the subroutine. When the control unit 31 determines to end the simulated battle, control proceeds to step S174.

In step S174, the control unit 31 sets the simulated battle flag "off" and updates the simulated battle flag data Dm, and ends the subroutine.

Referring back to FIG. 12, in step S109, the control unit 31 performs a transmission/reception process, and control proceeds to the next step. For instance, the control unit 31 transmits transmission data written in the transmission/reception data Ds as data to be transmitted to the server 200, to the server 200 through the network 100. The control unit 31 also receives data from the server 200 through the network 100, and writes the received data into the transmission/reception data Ds.

In a first non-limiting example, if the defense map data Dh has been written as transmission data in the transmission/reception data Ds in order to register the user's defense map into the server 200, the control unit 31 transmits, to the server 200, data for requesting registration of the defense map. As a result, the defense map indicated by the transmitted data is registered, into the server 200, as one of defense maps of battle opponents with which the user may be matched up in a battle game.

In a second non-limiting example, if a request for a battle has been written, as transmission data to be transmitted to the server 200, in the transmission/reception data Ds according to the user's operation of choosing "fight against another user," the control unit 31 transmits the data indicating the request for a battle to the server 200. As a result, the server 200 matches the user requesting a battle up with one of the registered battle opponents (defense map), and transmits battle opponent data indicating the matched-up battle opponent to the information processing apparatus 3 that has transmitted the request for a battle. When the battle opponent data is transmitted from the server 200, the control unit 31 receives and writes the battle opponent data into the transmission/reception data Ds in step S109. Note that the battle opponent data may include data indicating a defense map area DAe that has been produced by another user as a battle opponent matched up with the user performing map editing.

In a third non-limiting example, if a battle game between the user, on offense, and another user has been ended in step S108, and the result of the battle against the second user has been written as transmission data in the transmission/reception data Ds, the control unit 31 transmits battle result data indicating the result of the battle to the server 200. As a result, the server 200 transmits the battle result data to the information processing apparatus 3 of the second user as a battle opponent in the battle game. Note that the server 200 may transfer the battle result data received from the user's information processing apparatus 3 directly to the second user's information processing apparatus 3, or may perform a predetermined process on the battle result data received from the user's information processing apparatus 3 before transmitting the resultant battle result data to the second user's information processing apparatus 3.

In a fourth non-limiting example, if a battle game between the user and another user on offense matched up by the server 200 has been performed using the user's defense map registered in the server 200, battle result data indicating the result of a battle in the battle game is transmitted from the server 200. When the battle result data is transmitted from the server 200, the control unit 31 receives and writes the battle result data into the transmission/reception data Ds in step S109. As a result, the control unit 31 is notified that another user has performed a battle game against the user, on defense, using the user's defense map registered in the server 200.

Next, the control unit 31 performs a rate calculation process based on the result of an on-defense battle (step S110), and control proceeds to the next step. For instance, when the control unit 31 has received battle result data from the server 200 in step S109, the control unit 31 calculates the numerical value of a rate parameter which is to be added or subtracted to or from the user, based on the number of offensive objects and/or defensive objects at the end of the battle in the result of the battle indicated by the battle result data, and updates the rate parameter data Dq with the calculated numerical value. For instance, in the case where the rate increase/decrease condition illustrated in FIG. 10 is used, when the user, on defense, loses in a battle game in which the user is matched up with another user, a point corresponding to the number of opponent offensive player objects EOb remaining on a game map for a battle at the end of the battle game is subtracted from the rate point of the user themselves. Also, in the case where the rate increase/decrease condition illustrated in FIG. 10 is used, even when the user, on defense, wins a battle against another user on offense, the user cannot acquire a rate point. Note that in the case where a battle game is performed in which the user, on defense, is matched up with another user, the second user's energy parameter (participation parameter) is increased or decreased, and the energy parameter (participation parameter) of the user, on defense, is not increased or decreased.

Next, the control unit 31 performs an energy calculation process based on elapsed time (step S111), and control proceeds to the next step. For instance, the control unit 31 adds a predetermined value to the rate parameter indicated by the rate parameter data Dq, based on elapsed time, and updates the rate parameter data Dq with the rate parameter after the addition.

Next, the control unit 31 generates a display image and performs a display control process of displaying the display image on the display unit 35 (step S112), and control proceeds to the next step. For instance, the control unit 31 generates a display image corresponding to the result of each step (e.g., game map images during map editing and a battle), and performs a process of displaying the display image on the display unit 35.

Next, the control unit 31 determines whether or not to end the game process (step S113). The game process is ended under, for instance, the condition that the condition for ending the game process is satisfied, the condition that the user has performed an operation of ending the game process, etc. When the control unit 31 determines not to end the game process, control returns to step S102, in which the control unit 31 repeats the process. When the control unit 31 determines to end the game process, the control unit 31 ends the process of the flowchart.

Thus, in the information processing apparatus 3 that performs the above game process, in a battle game between the user and another user, the user, on offense, manually controls an offensive object according to the user's operation, and the user, on defense, controls a defensive object according to automatic control by the control unit. The user's offensive object is used when the user themselves fights against another user, and the user's defensive object is used when the user themselves is matched, as a battle opponent, up with another user. These types of objects appear in different scenes. However, in such an asynchronous battle game, a game map on which not only is a defensive object previously disposed on a defense map for depending against another user's attack, but also an offensive object is previously disposed on an offense map for attacking another user, is displayed on the display screen, and therefore, an image displayed on the display screen has the element of surprise, and objects can be disposed and observed in both offensive and defensive perspectives. Therefore, the game can be prevented from being monotonous.

In the above battle game between a plurality of users, a user on offense manually controls an offensive object according to the user's operation, and a user on defense controls a defensive object according to automatic control by a control unit. Alternatively, in a battle game, a user on offense may control an offensive object according to automatic control by a control unit, and a user on defense may manually control a defensive object according to the user's operation. Alternatively, in a battle game, both a user on offense and a user on defense may manually control an offensive object and a defensive object, respectively, according to the users' operations. Alternatively, in a battle game, both an offensive object and a defensive object may each be controlled according to automatic control by a control unit. In the above simulated battle, an object on offense is manually controlled according to a user's operation, and an object on defense is controlled according to automatic control by a control unit. Alternatively, in a simulated battle game, an object on offense may be controlled according to automatic control by a control unit, and an object on defense may be manually controlled according to a user's operation. Alternatively, in a simulated battle game, both an object on offense and an object on defense may each be manually controlled according to a user's operation. Alternatively, in a simulated battle game, both an offensive object and a defensive object may each be controlled according to automatic control by a control unit.

In the foregoing, a non-limiting example has been described in which an asynchronous battle process and simulated battle process between two users are performed in the information processing apparatus 3 of one of the two users. Alternatively, these processes may be performed in another apparatus coupled to the information processing apparatus 3 of one of the two users or another apparatus that can communicate with the information processing apparatus 3 of one of the two users. For instance, an asynchronous battle process and simulated battle process between two users may be performed in the server 200, and the results of the processes may be sequentially transmitted to the information processing apparatus 3 of one of the two users.

This non-limiting example may be a game system having the following non-limiting example configuration. Note that the parenthesized indications show a relationship with the above non-limiting example.

A non-limiting example configuration of this non-limiting example game system includes a storage means (e.g., the energy parameter data Dr), an increasing means (e.g., S111, S157), a starting means (e.g., S145, S146), a disposing means (e.g., S104, S146), an action control means (e.g., S148, S149), a first determining means (e.g., S149), and a second determining means (e.g., S156, S157). The storage means stores a parameter related to a user (e.g., the energy parameter (participation parameter)). The increasing means increases the parameter based on elapsed time. The starting means decreases a parameter stored in the storage means, and starts a game process related to a battle against another user. The disposing means disposes, on a grid-pattern game map, a friend character related to a user (e.g., an own offensive player object AOb), an opponent character related to another user (e.g., an opponent defensive player object EOd), and an object related to the second user (e.g., an opponent defensive equipment object EOc that gives a bonus). The action control means causes the friend character to perform an action on the game map according to the user's operation. The first determining means determines whether or not the friend character has performed a predetermined action (e.g., destruction) on the object. The second determining means determines whether or not a relationship between the friend character and the opponent character satisfies a predetermined win condition. In addition to the increase of the parameter based on elapsed time, the increasing means increases the parameter when the results of the determinations by the first and second determining means are positive.

In the above non-limiting example configuration, is a parameter consumed by a battle against another user is restored based on elapsed time, and in addition, can be acquired by satisfying the win condition for the battle and performing a predetermined action on an object in a game. Therefore, a battle game based on a novel game rule can be provided.

The non-limiting example configuration of the game system may be implemented in the form of a game program, information processing apparatus, and game control method.

In the foregoing, data is exchanged between information processing apparatuses 3 through the server 200. As a result, communication between information processing apparatuses 3 is centrally controlled by the server 200, and therefore, the matching up of a battle opponent and the communication control are easily performed. However, in the case where data may not be centrally held in the server 200, data may be exchanged between information processing apparatuses 3 or with other apparatuses without through the server 200.

In the foregoing non-limiting example, an information process is performed by the information processing apparatus 3. Alternatively, at least a portion of the above steps in the processes may be performed by another apparatus. For example, steps in the processes may be executed in cooperation with the server 200 or another apparatus (e.g., another game apparatus, another mobile terminal, etc.) that can communicate with the information processing apparatus 3. Thus, processes similar to the above processes can be performed by the server 200 or another apparatus performing a portion of the steps of the process. The above processes may be executed by a single processor or a plurality of cooperating processors included in an information processing system including at least one information processing apparatus. In the above non-limiting example, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the steps of the above processes may be performed by substantially any of the apparatuses, and this non-limiting example may be implemented by assigning the steps to the apparatuses in substantially any manner.

The order of steps, setting values, conditions for determination, etc., used in the above information process are merely for illustrative purposes, and other order of steps, setting values, conditions for determination, etc., may be used to implement this non-limiting example.

The above programs may be supplied to the information processing apparatus 3 not only through an external storage medium, such as an external memory, but also through a wired or wireless communication line. The programs may be previously stored in a non-volatile storage device in the information processing apparatus 3. Examples of an information storage medium storing the programs may include non-volatile memories, and in addition, CD-ROMs, DVDs, optical disc-like storage media similar thereto, and flexible disks, hard disks, magneto-optical disks, and magnetic tapes. The information storage medium storing the programs may be a volatile memory storing the programs. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertains. If there is any inconsistency or conflict, the present specification (including the definitions) shall prevail.

Thus, this non-limiting example is useful for, for example, a game program, information processing apparatus, game processing method, and game system, etc., for preventing a game from being monotonous in a battle process against another user's object.

What is claimed is:

1. A non-transitory computer-readable storage medium having stored therein a game program executed in a computer of a first information processing apparatus operated by a first user, wherein the game program comprises instructions configured to cause the computer of the first information processing apparatus to execute:
   disposing a first offensive object of the first user in an offensive field of the first user according to the first user's operation;
   disposing a defensive object of the first user in a defensive field of the first user according to the first user's operation;
   causing a display device to display a game field that is constructed by combining the offensive field of the first user with a defensive field of a second user, wherein the constructed game field does not include the defensive field of the first user, the defensive field of the second user including a defensive object of the second user disposed therein according to operation by a second user via a second information processing apparatus; and
   executing, based on input operations received from the first user, a battle process between the first offensive object of the first user and the defensive object of the second user by using the constructed game field, wherein, as part of the battle process, an asynchronous battle game is performed between the first user and the second user by using the defensive field of the second user in combination with the offensive field of the first user and provided input from the first user to control at least one offensive object during the battle process.

2. The non-transitory computer-readable storage medium according to claim 1, wherein the display device is caused to display the entirety of both the offensive field and defensive field including the first offensive object and the defensive object of the first user.

3. The non-transitory computer-readable storage medium according to claim 1, wherein the instructions are further configured to cause the computer of the first information processing apparatus to further execute:
   obtaining a result of a second battle process that is performed on a second game field that is constructed by combining the defensive field of the first user with an offensive field of the second user, the second battle process being between at least the disposed defensive object of the first user and an offensive object disposed by the second user, wherein, as part of the second battle process, the offensive object of the second user and the defensive object of the first user are disposed in the second game field, and the second battle process is performed according to the second user's operation.

4. The non-transitory computer-readable storage medium according to claim 1, wherein the instructions are further configured to cause the computer of the first information processing apparatus to further execute:
   choosing one of a plurality of kinds of terrains,
   the offensive field excludes an area in which the disposition of the first offensive object is limited, depending on the chosen terrain, and the defensive field includes an area in which the disposition of the defensive object is limited, depending on the chosen terrain.

5. The non-transitory computer-readable storage medium according to claim 1, wherein the instructions are further configured to cause the computer of the first information processing apparatus to further execute:
choosing a second offensive object of the first user different from the first offensive object disposed in the offensive field, according to the first user's operation, and
the battle process is performed between 1) the first and second offensive objects of the first user, 2) and the defensive object of the second user.

6. The non-transitory computer-readable storage medium according to claim 5, wherein
the first offensive object of the first user is set in the game field based on how the first offensive object of the first user was disposed in the offensive field before construction of the game field, and
the second offensive object of the first user is disposed in the game field according to the first user's operation after construction of the game field.

7. The non-transitory computer-readable storage medium according to claim 1, wherein the instructions are further configured to cause the computer of the first information processing apparatus to further execute:
performing a simulated battle process between the disposed first offensive object and defensive object of the first user.

8. The non-transitory computer-readable storage medium according to claim 3, wherein the instructions are further configured to cause the computer of the first information processing apparatus to further execute:
changing an assessment value related to the first user, depending on a result of the battle process, and changing the assessment value related to the second user, depending on the obtained result of the battle.

9. An information processing apparatus comprising:
a computer that includes at least one hardware processor, the computer configured to execute:
disposing an offensive object of the first user in an offensive field of the first user according to the first user's operation;
disposing a defensive object of the first user in a defensive field of the first user according to the first user's operation;
causing a display device to display a game field that is constructed by combining the offensive field of the first user with a defensive field of a second user, wherein the constructed game field does not include the defensive field of the first user, the defensive field including a defensive object of the second user disposed therein according to operation by a second user via second information processing apparatus, and
executing a battle process, based on input operations received from the first user, between the offensive object of the first user and the defensive object of the second user by using the constructed game field, wherein, as part of the battle process, an asynchronous battle game is performed between the first user and the second user by using the defensive field of the second user in combination with the offensive field of the first user and provided input from the first user to control at least one offensive object during the battle process.

10. A game processing method performed on a first computing system, the method comprising:
disposing an offensive object of the first user in an offensive field of the first user according to the first user's operation;
disposing a defensive object of the first user in a defensive field of the first user according to the first user's operation;
causing a display device to display a game field that is constructed by combining the offensive field of the first user with a defensive field of a second user, wherein the constructed game field does not include the defensive field of the first user, the defensive field including a defensive object of the second user disposed therein according to operations provided by a second user of a second computing system, and
executing, based on input operations received from the first user, a battle process between the offensive object of the first user and the defensive object of the second user by using the constructed game field, wherein, as part of the battle process, an asynchronous battle game is performed between the first user and the second user by using the defensive field of the second user in combination with the offensive field of the first user and provided input from the first user to control at least one offensive object during the battle process.

11. A game system comprising:
a plurality of information processing apparatuses including at least a first information processing apparatus operated by a first user and a second information processing apparatus operated by a second user, and a server that communicates with the first and second information processing apparatuses,
the first information processing apparatus includes a computer that is configured to perform operations comprising:
disposing an offensive object of the first user in an offensive field of the first user according to the first user's operation;
disposing a defensive object of the first user in a defensive field of the first user according to the first user's operation;
causing a display device to display at least a portion of the offensive and defensive fields including the disposed offensive and defensive objects of the first user; and
exchanging data with the server,
the second information processing apparatus includes a computer that is configured to perform operations comprising:
disposing an offensive object of the second user in an offensive field of the second user according to the second user's operation;
disposing a defensive object of the second user in a defensive field of the second user according to the second user's operation;
causing a display device to display at least a portion of the offensive and defensive fields including the disposed offensive and defensive objects of the second user; and
exchanging data with the server,
the server includes a computer that is configured to perform operations comprising:
storing at least data received from the second information processing apparatus; and transmitting the stored data to the first information processing apparatus in response to a request from the first information processing apparatus, the computer of the first information processing apparatus is further configured to perform operations comprising:

causing a display device that is coupled to the first information processing apparatus to display a game field that is constructed by combining the offensive field of the first user with the defensive field of the second user, wherein the constructed game field does not include the defensive field of the first user, the defensive field including the defensive object of the second user disposed therein according to operation by the second user; and executing, based on input operations received from the first user, a battle process between the offensive object of the first user and the defensive object of the second user by using the constructed game field, wherein, as part of the battle process, an asynchronous battle game is performed between the first user and the second user by using the defensive field of the second user in combination with the offensive field of the first user and provided input from the first user to control at least one offensive object during the battle process.

12. The game system of claim 11, wherein defensive objects in the defensive field are automatically controlled during the battle process.

13. A non-transitory computer-readable storage medium having stored therein a game program executed in a computer of a first information processing apparatus operated by a first user, wherein the game program comprises instructions configured to cause the computer of the first information processing apparatus to execute:

disposing a first offensive object of the first user in an offensive field of the first user according to the first user's operation;

disposing a defensive object of the first user in a defensive field of the first user according to the first user's operation;

causing a display device to display a game field that is constructed by combining the offensive field of the first user with a defensive field of a second user, the defensive field of the second user including a defensive object of the second user disposed therein according to operation by a second user via a second information processing apparatus;

executing, based on input operations received from the first user, a battle process between the first offensive object of the first user and the defensive object of the second user by using the constructed game field, wherein the battle process is executed as part of an asynchronous battle game; and obtaining a result of a second battle process, which is part of the asynchronous battle game, that is performed on a second game field that is constructed by combining the defensive field of the first user with an offensive field of the second user, the second battle process being between at least the disposed defensive object of the first user and an offensive object disposed by the second user, wherein, as part of the second battle process, the offensive object of the second user and the defensive object of the first user are disposed in the second game field, and the second battle process is performed according to the second user's operation.

14. A non-transitory computer-readable storage medium having stored therein a game program executed in a computer of a first information processing apparatus operated by a first user, wherein the game program comprises instructions configured to cause the computer of the first information processing apparatus to execute:

disposing a first offensive object of the first user in an offensive field of the first user according to the first user's operation;

disposing a defensive object of the first user in a defensive field of the first user according to the first user's operation;

causing a display device to display a game field that is constructed by combining the offensive field of the first user with a defensive field of a second user, the defensive field of the second user including a defensive object of the second user disposed therein according to operation by a second user via a second information processing apparatus, wherein the game field that is constructed by combining the offensive field of the first user with a defensive field of a second user does not include the defensive field of the first user; and executing, based on input operations received from the first user, a battle process between the first offensive object of the first user and the defensive object of the second user by using the constructed game field, wherein the battle process is executed as part of an asynchronous battle game.

* * * * *